United States Patent
De Mondt et al.

(10) Patent No.: US 10,662,532 B2
(45) Date of Patent: *May 26, 2020

(54) METHODS OF MANUFACTURING EMBOSSING ELEMENTS

(71) Applicants: AGFA GRAPHICS NV, Mortsel (BE); AGFA-GEVAERT, Mortsel (BE)

(72) Inventors: Roel De Mondt, Mortsel (BE); Rita Torfs, Mortsel (BE); Johan Loccufier, Mortsel (BE)

(73) Assignees: AGFA-GEVAERT N.V., Mortsel (BE); AGFA NV, Mortsel (BE)

( * ) Notice: Subject to any disclaimer, the term of this patent is extended or adjusted under 35 U.S.C. 154(b) by 60 days.

This patent is subject to a terminal disclaimer.

(21) Appl. No.: 15/514,588

(22) PCT Filed: Jun. 1, 2015

(86) PCT No.: PCT/EP2015/062107
§ 371 (c)(1),
(2) Date: Mar. 27, 2017

(87) PCT Pub. No.: WO2016/050372
PCT Pub. Date: Apr. 7, 2016

(65) Prior Publication Data
US 2017/0218520 A1    Aug. 3, 2017

(30) Foreign Application Priority Data

Sep. 29, 2014 (EP) .................................. 14186726

(51) Int. Cl.
*C23F 1/02* (2006.01)
*C23F 1/16* (2006.01)
(Continued)

(52) U.S. Cl.
CPC .............. *C23F 1/16* (2013.01); *B29C 59/022* (2013.01); *B41J 2/01* (2013.01); *B41M 5/0023* (2013.01);
(Continued)

(58) Field of Classification Search
CPC ....... C23F 1/16; C23F 1/00; C23F 1/14; C23F 1/02; C09D 11/101; C09D 11/30; C09D 11/107
See application file for complete search history.

(56) References Cited

U.S. PATENT DOCUMENTS

| 4,636,534 A | 1/1987 | Nawata et al. |
| 2006/0156672 A1* | 7/2006 | Laurent .................... B44C 1/24 52/589.1 |

(Continued)

FOREIGN PATENT DOCUMENTS

| EP | 0 588 533 A2 | 3/1994 |
| EP | 2 145 932 A1 | 1/2010 |
| EP | 2 865 527 A1 | 4/2015 |
| WO | 2004/026977 A1 | 4/2004 |
| WO | 2008/021780 A1 | 2/2008 |
| WO | 2014/014400 A1 | 1/2014 |

OTHER PUBLICATIONS

Official Communication issued in International Patent Application No. PCT/EP2015/062107, dated Oct. 30, 2015.

*Primary Examiner* — Thomas T Pham
(74) *Attorney, Agent, or Firm* — Keating and Bennett, LLP

(57) ABSTRACT

A method of manufacturing an embossing element for decorative surfaces includes the steps of: a) UV curable inkjet printing a decorative pattern on a metallic surface; and b) forming a relief by etching metal from the metallic surface.

13 Claims, 2 Drawing Sheets

(51) Int. Cl.
| | |
|---|---|
| *C09D 11/30* | (2014.01) |
| *C09D 11/101* | (2014.01) |
| *B41J 2/01* | (2006.01) |
| *B41M 5/00* | (2006.01) |
| *B41M 7/00* | (2006.01) |
| *C09D 11/107* | (2014.01) |
| *C09D 11/328* | (2014.01) |
| *C25D 5/02* | (2006.01) |
| *B29C 59/02* | (2006.01) |
| *B29L 9/00* | (2006.01) |

(52) U.S. Cl.
CPC ........ *B41M 5/0047* (2013.01); *B41M 5/0058* (2013.01); *B41M 7/0009* (2013.01); *B41M 7/0081* (2013.01); *C09D 11/101* (2013.01); *C09D 11/107* (2013.01); *C09D 11/30* (2013.01); *C09D 11/328* (2013.01); *C25D 5/022* (2013.01); *B29L 2009/00* (2013.01); *B41M 2205/14* (2013.01); *B41M 2205/18* (2013.01)

(56) References Cited

U.S. PATENT DOCUMENTS

| | | | |
|---|---|---|---|
| 2007/0068898 A1* | 3/2007 | Lorenz | B41J 2/01 216/27 |
| 2011/0024392 A1* | 2/2011 | Sato | C09D 11/101 216/48 |
| 2012/0241410 A1* | 9/2012 | Mills | C23F 1/02 216/59 |
| 2013/0078437 A1* | 3/2013 | Symkens | B44C 1/00 428/203 |
| 2013/0186672 A1 | 7/2013 | Kariya et al. | |
| 2014/0045966 A1* | 2/2014 | Motofuji | C08F 2/48 522/183 |
| 2014/0242342 A1* | 8/2014 | Vandevoorde | E04F 15/02038 428/157 |
| 2015/0212413 A1* | 7/2015 | Umeda | G03F 7/027 428/195.1 |
| 2016/0315201 A1* | 10/2016 | Lee | H01L 29/66969 |

* cited by examiner

METHODS OF MANUFACTURING EMBOSSING ELEMENTS

CROSS REFERENCE TO RELATED APPLICATIONS

This application is a 371 National Stage Application of PCT/EP2015/062107, filed Jun. 1, 2015. This application claims the benefit of European Application No. 14186726.7, filed Sep. 29, 2014, which is incorporated by reference herein in its entirety.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are (1) Agfa-Gevaert NV, and (2) Agfa Graphics NV, now doing business as AGFA NV.

BACKGROUND OF THE INVENTION

1. Field of the Invention

The present invention relates to the manufacturing of embossing elements and of decorative laminates using inkjet technology.

2. Description of the Related Art

Gravure, offset and flexography are being increasingly replaced for different applications by industrial inkjet printing systems, because of their flexibility in use, such as variable data printing making short production runs and personalized products possible at low cost, and their enhanced reliability, allowing incorporation into production lines.

EP 2865527 A (AGFA GRAPHICS) discloses a method of manufacturing a decorative surface including the steps of: a) impregnating a paper substrate with a thermosetting resin; b) jetting a colour pattern with one or more aqueous inkjet inks including a polymer latex binder on the thermosetting resin impregnated paper; c) drying the one or more aqueous inkjet inks; and d) heat pressing the thermosetting paper carrying the colour pattern into a decorative surface. A major advantage of the described method is that a floor laminate manufacturer (20) can manufacture the decorative layer (34) by inkjet printing in-house. As a consequence, the floor laminate manufacturer (20) is no longer obliged by the décor printer (13) to purchase minimum quantities of décor paper rolls (16) for his warehouse (17) and is no longer dependent on décor paper roll delivery periods set by the décor printer (13) for market introduction of laminates made therewith.

Decorative laminates, like the flooring laminates disclosed by EP 2865527 A (AGFA GRAPHICS), are generally heat pressed at a size of about 2.8 m×2.1 m, which is dictated by the standard dimensions of the heat presses used in that industry. During this heat pressing usually an embossing plate having a relief, e.g. corresponding to the wood grain of a printed decorative wood colour pattern present in the laminate, is employed to deliver decorative panels having a surface relief matching the printed wood grain of the panel. Such embossing plates can be ordered at companies specialized in engraving metal surfaces, but these generally tend to have even longer delivery periods than the décor paper rolls from a décor printer. The latter destroys the advantage of having large variation in the decorative patterns by inkjet. It should be noted that a typical heat press produces about 5 $m^2$ of laminate. A typical room at home is about 25 $m^2$, meaning that in that room each decorative panel will occur about five times, representing an undesirable repetition observable by the customer.

One approach to solve this problem of repetitive decorative panels in a room is to use different heat presses with different embossing plates and then after cutting into panels, mix up the panels in the packaged sets of panels offered for sale. This not only causes a complex sorting and a limitation of flexibility in manufacturing, but one can not be sure which packages will eventually be selected in a store by a customer so that the repetition of decorative panels in a room may not be effectively avoided.

Another approach is to introduce a DVEIR embossing technique for inkjet printed decorative laminates as disclosed by WO 2014/014400 A (FLOOR IPTECH), where an inkjet ink (41) is printed on a foil (40a) and a cavity (37) is pressed into the surface layer (2) of a building panel (1) in register with a decorative print (P). However, the thickness of the foil is a very critical parameter. If a thin foil is used, creases may occur that causes artifacts in the embossed relief or worse a rupture of the foil may occur. If the thickness of the foil is increased, no sharp relief can be realized like that made by a classic embossing plate.

Hence, there is still a need for improved methods of variable embossing when manufacturing decorative laminates.

SUMMARY OF THE INVENTION

In order to overcome the problems described above, preferred embodiments of the present invention have been realised with a method of manufacturing an embossing element as defined below.

The embossing element can be effectively used in manufacturing decorative surfaces, like decorative panels and also broadloom PVC rolls. PVC rolls are today embossed using an embossing roll generally causing a repeat of the embossed decorative pattern every 130 cm in an embossed broadloom PVC roll. By using an embossing belt manufactured according to the methods described below, this repetition is eliminated.

As the manufacturing process of the embossing plate requires next to a wide format inkjet printer rather basic equipment, such as an etching bath, the manufacturing can be performed at the factory plant of a decorative laminate manufacturer. The same digital file used for inkjet printing can be used for inkjet printing a decorative pattern (2) with the UV curable inkjet ink on a metal plate (1).

Further advantages and preferred embodiments of the present invention will become apparent from the following description.

BRIEF DESCRIPTION OF THE DRAWINGS

In FIG. 1a, a metal plate (1) is provided for UV curable inkjet printing a decorative pattern (2) in FIG. 1b on the metallic surface of the metal plate (1). In FIG. 1c, metal is etched away from uncovered metal surface, while the metal covered by the decorative pattern (3) remains substantially intact. An embossing plate (5) having a relief (4) is obtained in FIG. 1d after stripping the curable inkjet printed decorative pattern. Alternatively it is also possible after etching to apply a second decorative pattern (6) by UV curable inkjet printing as shown in FIG. 1b'. Then a second etch step in FIG. 1c' removes further metal from uncovered metal surface, while the metal covered by decorative pattern remains substantially intact. An embossing plate (5) having a relief (4) and a second relief (7) of a different height is obtained in FIG. 1d' after stripping the curable inkjet printed decorative pattern.

In FIG. 5A, a frame (31) is firmly mounted on a metal plate (1). In FIG. 5B, which is a cross-section along the dotted line shown in FIG. 5A, the metal plate (1) is first tilted under an angle α and then an etchant inlet (32) is positioned on one side of the frame (31). Etchant flows in a direction (33) through the etchant inlet (32), whereafter it flows in a direction (34) over the surface of the metal plate (1), before being evacuated in a direction (35) via the etchant outlet (36). Depending on the angle α, the etchant is recirculated a plurality of times from the etchant outlet (36) to the etchant inlet (32).

DETAILED DESCRIPTION OF THE PREFERRED EMBODIMENTS

Definitions

Figure 1:
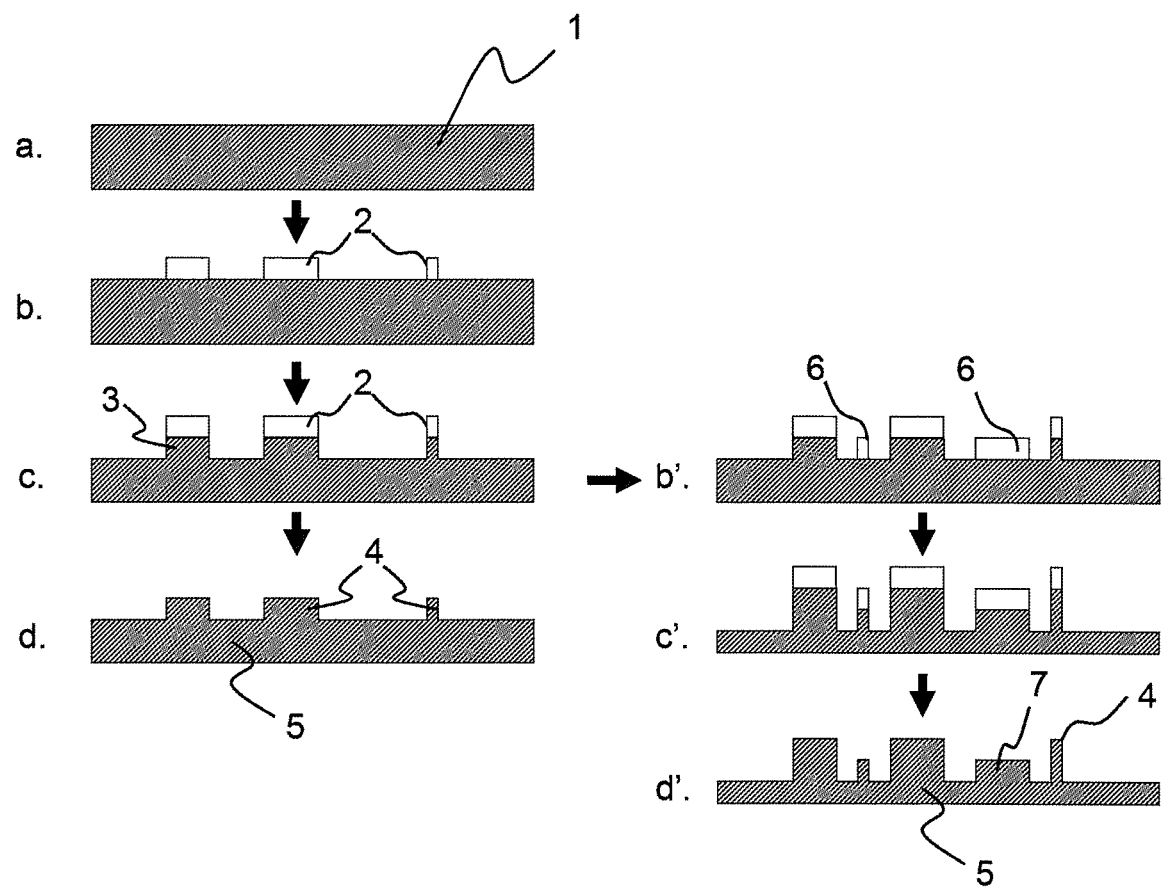
FIG. 1 shows preferred embodiments of the manufacturing method for embossing elements for decorative surfaces.
Figure 2:
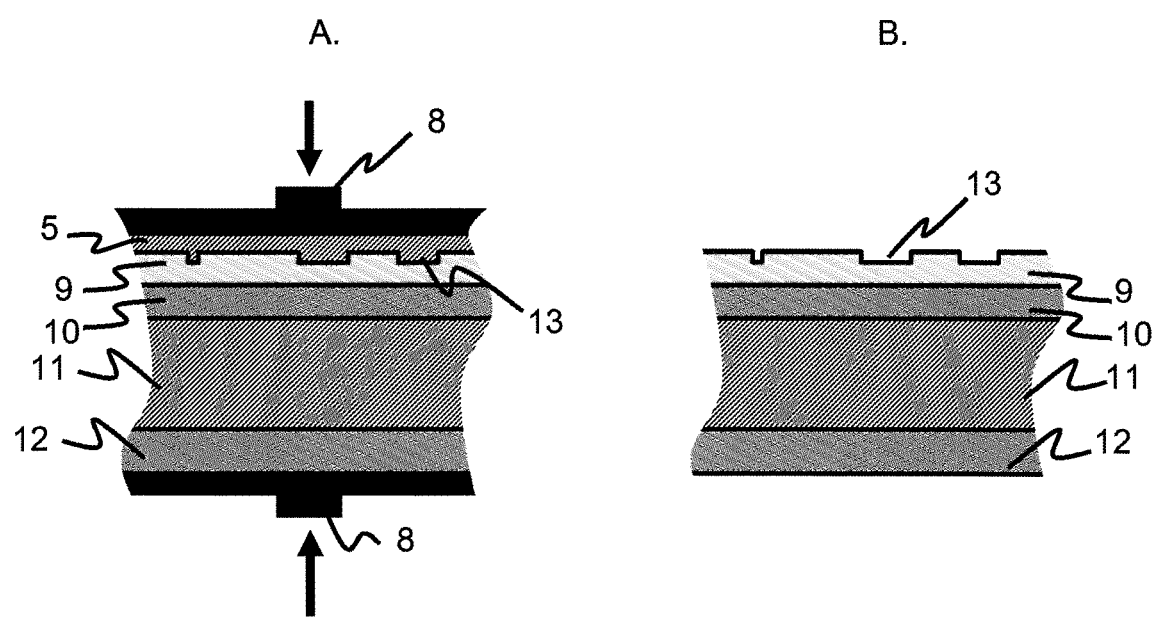
FIG. 2 shows a heat press (8) wherein an embossing plate (5) is embossing a cavity (13) into the protective layer (9) of a layer assembly further including a decorative layer (10), a base layer (11) and a back layer (12). After cooling, a decorative panel is obtained in FIG. 2B consisting of a protective layer (9) having a cavity (13), a decorative layer (10), a base layer (11) and a back layer (12).
Figure 3:
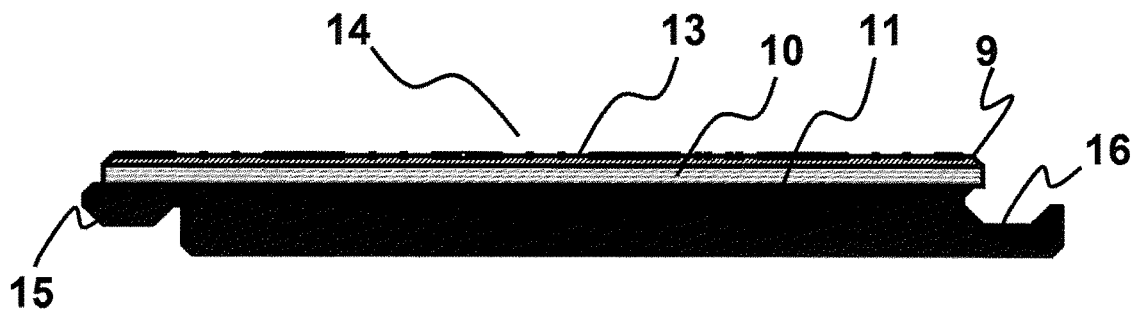
FIG. 3 shows a cross-section of a decorative panel (14) including a base layer (11) with a tongue (15) and groove (16) laminated on the top side by a decorative layer (10) and a protective layer (9), the latter having a relief including a cavity (13).

The term "monofunctional" in e.g. monofunctional polymerizable compound means that the polymerizable compound includes one polymerizable group.

The term "difunctional" in e.g. difunctional polymerizable compound means that the polymerizable compound includes two polymerizable groups.

The term "polyfunctional" in e.g. polyfunctional polymerizable compound means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —NO$_2$.

Methods of Manufacturing Embossing Elements

A method of manufacturing an embossing element (5) for decorative surfaces according to a preferred embodiment of the invention includes the steps of: a) UV curable inkjet printing a decorative pattern (2) on a metallic surface (1); and b) forming a relief (4) by etching metal from the metallic surface.

In a preferred embodiment of the method, a second decorative pattern is UV curable inkjet printed on a part of etched metallic surface, and a further relief is formed by etching metal from the metallic surface. It should be clear that if desired a third, fourth, fifth, . . . decorative pattern may be UV curable inkjet printed, each time followed by etching.

In one preferred embodiment, the UV curable inkjet printed decorative pattern is not removed after etching as it increases the relief height. Furthermore, if the UV curable inkjet ink used for printing the decorative pattern includes a colorant the mounting of the embossing element and the bringing it into register with the decorative pattern of the laminate assembly is facilitated.

In another preferred embodiment, the UV curable inkjet printed decorative pattern is removed by stripping. More preferably, the UV inkjet printed decorative pattern is stripped from the metallic surface using an alkaline stripping solution, preferably free of organic solvent as this allows for eco-friendly recovery of the etched metal ions from the stripping solution. The stripped decorative pattern flakes are recovered by filtration.

In still another preferred embodiment, the UV inkjet printed decorative pattern is stripped from the metallic surface and dissolved in the alkaline stripping solution. This stripping method avoids problems of clogging of filters by decorative pattern flakes.

Etching of the metal surface as in step b) is performed by using an etchant. The etchant is preferably an aqueous solution having a pH<3 or wherein 8<pH<10, more preferably an aqueous solution having a pH<3, especially if the UV curable inkjet printed decorative pattern is to be removed by stripping.

In a preferred embodiment, the etchant is an acid aqueous solution having a pH of less than 2. The acid etchant preferably includes at least one acid selected from the group consisting of nitric acid, picric acid, hydrochloric acid, hydrofluoric acid and sulphuric acid.

Preferred etchants known in the art include Kalling's No 2, ASTM No 30, Kellers Etch, Klemm's Reagent, Kroll's Reagent, Marble's Reagent, Murakami's Reagent, Picral and Vilella's Reagent.

In another preferred embodiment, the etchant is an alkaline aqueous solution having a pH of no more than 9. The alkaline etchant preferably includes at least one base selected from the group consisting of ammonia or ammonium hydroxide, potassium hydroxide and sodium hydroxide.

The etchant may also contain a metal salt such as copper dichloride, copper sulphate, potassium ferricyanide and iron trichloride.

The duration of etching is determined by the desired relief height. For reasons of productivity, especially in the case of embossing belts, the etching is preferably performed in a time frame of less than an hour, preferably in a time frame of 5 to 45 minutes, more preferably 10 to 30 minutes. An increase in temperature generally accelerates the etching. Etching is preferably performed at a temperature between 35 and 50° C.

In a preferred embodiment, etching is performed by spraying, preferably at a pressure of at least 1 bar, more preferably 1 to 2 bar. In the latter case, an optimal etching performance is achieved.

Before etching, the UV curable inkjet printed pattern is preferably given a heat treatment, preferably 10 to 45 minutes at 130 to 170° C., more preferably 20 to 30 minutes at 150° C.

Etching is preferably followed by rinsing with water to remove any residual etchant.

After etching, the cured UV curable inkjet ink may be removed by stripping. In a preferred embodiment, the UV inkjet printed decorative pattern is removed in step c) by an alkaline stripping solution. Such an alkaline stripping solution is usually an aqueous solution with a pH>10.

The stripping solution or stripping bath is preferably an alkaline solution containing soda, potassium carbonate, alkaline metal hydroxides, such as sodium or potassium hydroxide, or based on amines such as mono or tri ethanolamine and tetra methyl ammonium hydroxide. A preferred stripping solution contains at least 5 wt % of sodium or potassium hydroxide. The stripping solution in use preferably has a temperature between 30° C. and 85° C., more preferably 40° C. to 55° C. The stripping solution is preferably substantially free of organic solvent and most preferably contains no organic solvent. The latter facilitates an eco-friendly recovery of metal from used stripping solutions. In a preferred embodiment, spraying is used to apply the stripping solution. Implementing pressure by using spraying during stripping will increase the stripping speed and improves the degradation speed of the flakes.

Figure 5:
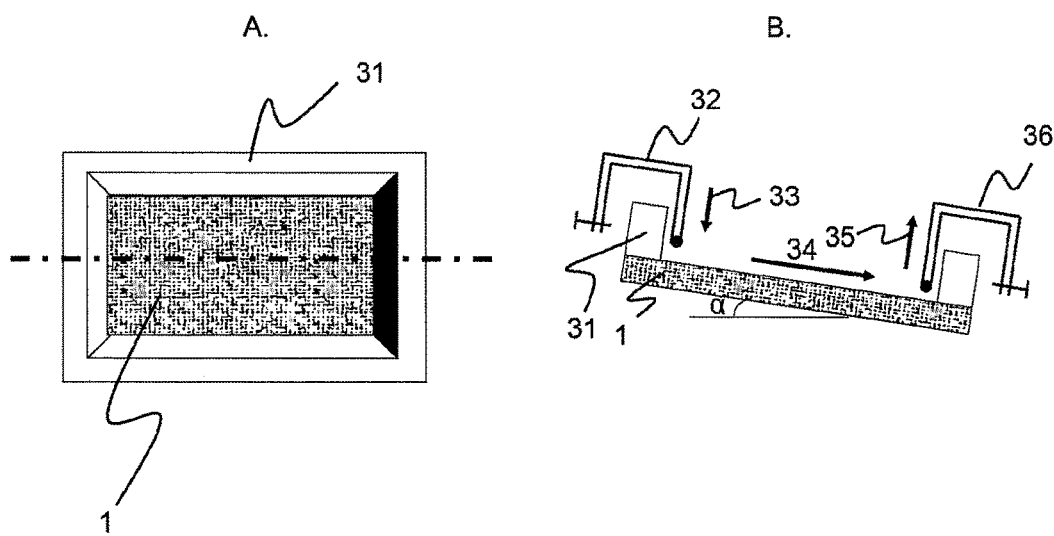
FIG. 5 shows a set-up for etching a metal plate (1).

The equipment for performing the etching and the optional stripping is dependent on the application and the dimension of the metal substrate. A possible set-up for etching a metal plate for a decorative panel is shown in FIG. 5A. In case an embossing belt would be needed, preferably an etch bath is used through which the metal belt carrying the cured UV curable inkjet printed decorative pattern is transported at a controlled speed.

In a preferred embodiment, the metal surface is cleaned before printing the UV curable inkjet ink. This is especially desirable when the metal surface is handled by hand and no gloves are worn. The cleaning removes dust particles and grease which can interfere in the adhesion of the UV curable inkjet ink to the metal surface. Besides degreasing, roughness is preferably introduced by brushing or micro-etching the metal surface. This generally improves the adhesion of the UV curable inkjet ink to the metal surface, which results in an improved etch resistance.

Embossing Elements

The embossing element is preferably used to emboss a relief in a soft surface or in a surface that is made soft, for example, by heating.

The shape of the embossing element may be chosen as desired. For example, it can have the shape of an embossing roll.

In a preferred embodiment, the embossing element has the shape of a plate. Such a shape is especially suitable for manufacturing decorative panels, like wood flooring laminate, because it allows for easy registering of the decorative pattern in a laminate assembly with the corresponding embossing relief of an embossing plate. The shape of a plate is also convenient for selecting a suitable UV inkjet printing device. UV curable wide format inkjet printers are abundantly available, e.g. for sign and display applications, contrary to inkjet printing devices for printing on a roll.

In a preferred embodiment, the embossing element has the shape of a belt. Such a shape is very convenient when laminate rolls have to be embossed. The decorative pattern for these laminate rolls is preferably inkjet printed by an in-line single pass inkjet printing device, followed by the already prepared embossing belt carrying a relief corresponding to inkjet printed decorative pattern, embossing the relief in register with the decorative pattern into at least the protective layer of the laminate assembly. The embossing belt may also be a so-called endless belt.

The embossing elements can be advantageously used in the production of decorative surface, like flooring laminate, broadloom PVC rolls and the like. However, there is no limitation on the type application. The embossing elements may also be used in the minting industry for producing coins which usually have some kind of decoration next to its value, or for embossing different types of substrates like leatherette, wall paper, packaging, furniture foils, ceramic tiles, PVC plates, MDF plates, wood panels, cushion vinyl, gift paper, or even as art work.

There is also no limitation on the type of metal used as initial substrate for the embossing element. However, for industrial applications preferably stainless steel is used. Depending on the application, other suitable metals include aluminium, brass, copper, inconel, manganese, nickel, silver, steel, zinc and titanium. It should be clear that the term metal here is used to include alloys.

Methods for Manufacturing Embossed Decorative Surfaces

In a preferred embodiment, the embossing element is used to manufacture decorative surfaces.

A method for manufacturing an embossed decorative surface, preferably a decorative panel, according to a preferred embodiment of the invention includes the steps:

manufacturing an embossing element (5) for decorative surfaces as described above;

inkjet printing on a substrate a decorative pattern (10) corresponding with the relief of the embossing element; and heat pressing (8) the embossing element (5) on a laminate assembly including the substrate with the decorative pattern (10) in register with the relief of the embossing element.

In one preferred embodiment, the laminate assembly includes one or more resin impregnated papers. The resin is preferably a thermosetting resin selected from the group consisting of melamine-formaldehyde based resins, ureum-formaldehyde based resins and phenol-formaldehyde based resins.

Figure 4:
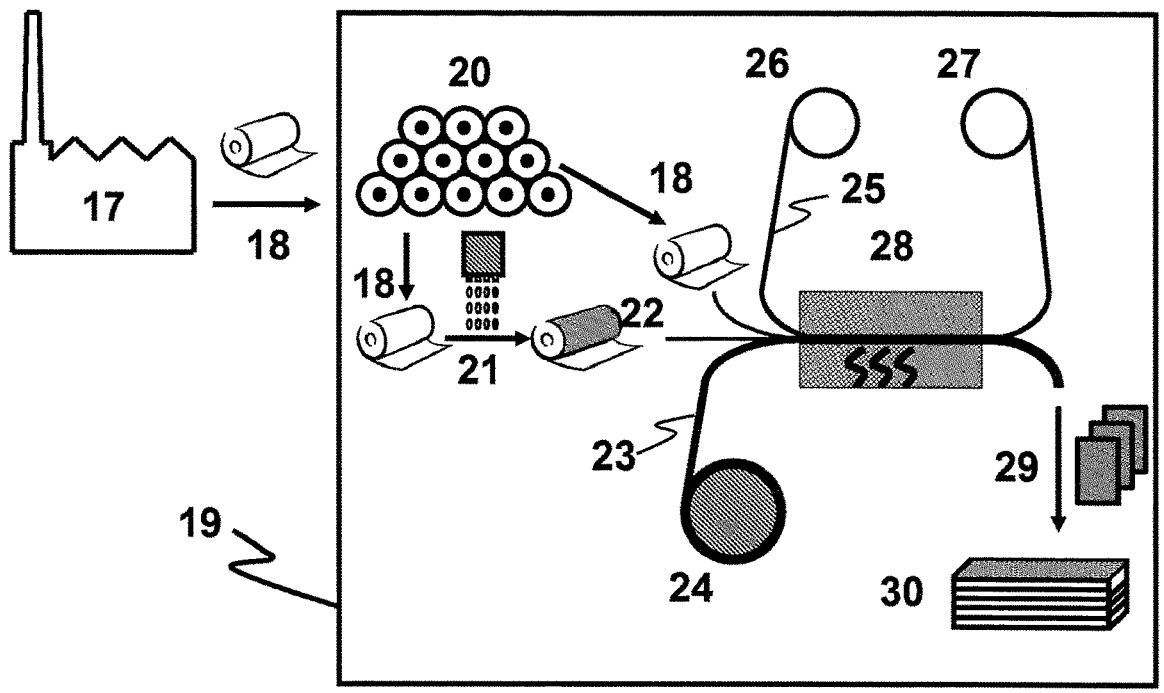
FIG. 4 shows a production process for manufacturing decorative panels, wherein a PVC roll manufacturer (17) supplies PVC rolls (18) to a warehouse (20) of a floor panel manufacturer (19), who prepares a decorative PVC roll (22) by inkjet printing (21) on a PVC roll (18). The floor panel manufacturer (19) then makes an assembly of layers from the PVC roll (18), the decorative PVC roll (22) and a base layer (23) from a roll of base layer (24), which after heat-pressing (28) into a single unit are cut into decorative panels (29) that are collected in a decorative panel set (30) ready for sale. During the heat pressing, an embossing belt (25) from an unwind system (26) is contacted with the top surface of the PVC roll (18) used in making the assembly of layers for embossing a relief in register with the decorative pattern of the decorative PVC roll (22). After embossing, the embossing belt (25) is rolled on a rewind system (27).

In another preferred embodiment, the laminate assembly includes thermoplastic foils, preferably one or more polyvinylchloride foils. An example of a method for manufacturing such an assembly is given by FIG. 4.

Decorative Surfaces

The decorative surfaces may come in the shape of broadloom decorative surfaces like decorative PVC rolls, but preferably they are decorative panels. In the case of a floor or wall decorative surface, the decorative panel include a tongue and a groove. The decorative panels are preferably selected from the group consisting of kitchen panels, flooring panels, furniture panels, ceiling panels and wall panels.

Generally, a decorative panel (14) contains a base layer (11) with on one side a decorative layer (10) covered by a protective layer (9) having an embossed relief, while a back layer (12) is provided on the other side of the base layer (11) for preventing curl of the panel.

In one preferred embodiment, a decorative panel obtained by the method according to the present invention includes an inkjet printed decorative pattern on a resin impregnated paper. Such decorative layers (10) can, for example, be made by an inkjet printing method as disclosed in EP 2865527 A (AGFA GRAPHICS). The base layer is preferably made of wood-based materials, such as particle board, MDF or HDF (Medium Density Fibreboard or High Density Fibreboard), Oriented Strand Board (OSB) or the like. Also, use can be made of boards of synthetic material or boards hardened by means of water, such as cement boards. In a particularly preferred embodiment, the base layer is a MDF or HDF board.

The decorative layer (10), the protective layer (9) and an optional back layer (12) may all include a resin impregnated paper. Suitable paper sheets having high porosity and their manufacturing are also disclosed by U.S. Pat. No. 6,709,764 (ARJO WIGGINS).

The resin impregnation may be performed before or after inkjet printing the decorative pattern. In case the inkjet printing is performed before resin impregnation, then preferably an ink acceptance layer including a polymeric binder, like polyvinylalcohol, and a pigment, like silica, is present to improve the image quality of the decorative pattern.

The resin is preferably a thermosetting resin selected from the group consisting of melamine-formaldehyde based resins, ureum-formaldehyde based resins and phenol-formaldehyde based resins. Other suitable resins for impregnating the paper are listed in of EP 2274485 A (HUELSTA). Most preferably the thermosetting resin is a melamine-formaldehyde based resin, often simply referred to in the art as a 'melamine (based) resin'.

In another preferred embodiment, a decorative panel obtained by the method according to the present invention includes an inkjet printed decorative pattern between two thermoplastic foils, wherein at least one of the two thermoplastic foils is a transparent foil. For example, the inkjet printed decorative pattern may be present on a first thermoplastic foil which forms the decorative layer (10) and a second transparent foil as the protective layer (9), and preferably also a base layer (11) for enhancing the rigidness of the panel. The first thermoplastic foil is preferably an opaque, more preferably a white opaque thermoplastic foil for enhancing image quality and masking defects in the base layer.

In a more preferred embodiment, the decorative panel includes a tongue and groove for glue-less interlocking with decorative panels having a similar tongue and groove. In a more preferred embodiment, the tongue (15) and groove (16) are part of the base layer (11). Decorative panels including a tongue and a groove of a special shape can be clicked into one another. The advantage thereof is a fast and easy assembly of a floor or wall requiring no glue. The shape of the tongue and groove necessary for obtaining a good mechanical join is well-known in the art of laminate flooring, as exemplified in EP 2280130 A (FLOORING IND), WO 2004/053258 (FLOORING IND), US 2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

A decorative panel, like a floor panel, has one decorative layer. However, a decorative layer may be applied on both sides of a base layer. The latter is especially desirable in the case of decorative panels for furniture. In such a case, preferably also a protective layer is applied on both decorative layers present on both sides of the base layer.

The decorative panels may further include a sound-absorbing layer as disclosed by U.S. Pat. No. 8,196,366 (UNILIN).

UV Curable Inkjet Inks

The UV curable inkjet ink is printed on the metallic surface as a decorative pattern. As it is resistant to etching, the metal beneath is also protected against etching.

The UV curable inkjet ink may be cationically curable, but is preferably a free radical UV curable inkjet ink. The UV curable inkjet ink can be cured by e-beam, but are preferably cured by UV light.

Non-Stripped UV Curable Inkjet Inks

In a first preferred embodiment, the UV curable inkjet ink, preferably containing a colorant, is not removed after etching. The advantage thereof is that the mounting is facilitated in a heating press.

Strippable UV Curable Inkjet Inks

In a second more preferred embodiment, the UV curable inkjet ink is stripped after etching. This means that the UV curable inkjet ink is resistant to etching but not to stripping. To achieve this, a specific UV curable inkjet ink composition is necessary.

In a particularly preferred second preferred embodiment, the UV curable inkjet ink includes a polymerizable composition, wherein at least 80 wt %, preferably at least 90 wt % and most preferably 100 wt % of the polymerizable composition consists of:

a) 15.0 to 70.0 wt % of an acryl amide;

b) 20.0 to 75.0 wt % of a polyfunctional acrylate; and c) 1.0 to 15.0 wt % of a monofunctional (meth)acrylate containing a carboxylic acid group, a phosphoric acid group or a phosphonic acid group; with all weight percentages (wt %) based on the total weight of the polymerizable composition.

The above preferred UV curable inkjet ink includes at least 15.0 to 70.0 wt %, preferably at least 20.0 to 65.0 wt % and most preferably at least 30.0 to 60.0 wt % of an acryl amide in the polymerizable composition, with all weight percentages (wt %) based on the total weight of the polymerizable composition. A single acryl amide or a mixture of acryl amides may be used. Preferred acryl amides are disclosed in Table 1.

TABLE 1

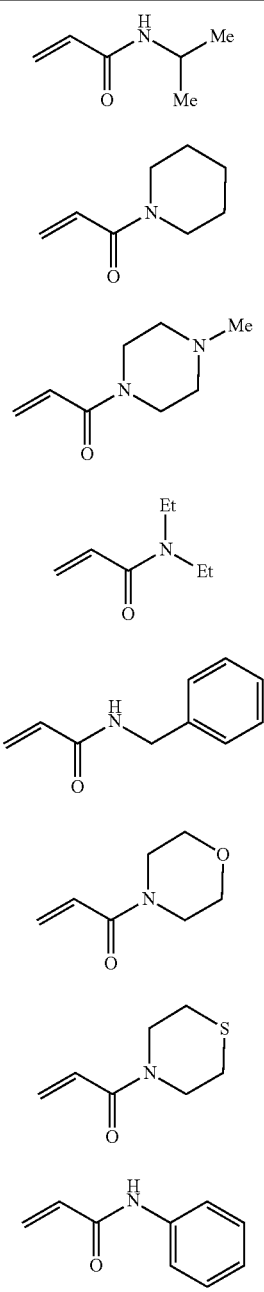

TABLE 1-continued

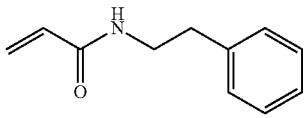
AA-9

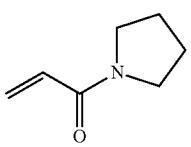
AA-10

In a preferred embodiment, the acryl amide is a cyclic acryl amide. In the most preferred embodiment of the UV curable inkjet ink, the acryl amide is acryloyl morpholine.

The above preferred UV curable inkjet ink includes at least 20.0 to 75.0 wt %, preferably at least 30.0 to 65.0 wt % and most preferably at least 40.0 to 55.0 wt % of a polyfunctional acrylate in the polymerizable composition, with all weight percentages (wt %) based on the total weight of the polymerizable composition.

A single polyfunctional acrylate or a mixture of polyfunctional acrylates may be used.

In a preferred embodiment, the polyfunctional acrylate is selected from the group consisting of dipropylene glycol diacrylate, neopentylglycol diacrylate, neopentylglycol (2× propoxylated) diacrylate, penta erythritol tetraacrylate, 1,6-hexanediol diacrylate, trimethylolpropane triacrylate, ethoxylated trimethylolpropane triacrylate, tripropylene glycol diacrylate, ditrimethyloylpropane tetraacrylate, ethoxylated pentaerythritol tetraacrylate, and polyethyleneglycol diacrylate.

In the most preferred embodiment of the UV curable inkjet ink, the polyfunctional acrylate includes a neopentylglycol hydroxy pivalate diacrylate.

The above preferred UV curable inkjet ink includes at least 1 to 15 wt %, preferably at least 2 to 12 wt % and most preferably at least 4 to 8 wt % of a (meth)acrylate containing a carboxylic acid group, a phosphoric acid group or a phosphonic acid group in the polymerizable composition, with all weight percentages (wt %) based on the total weight of the polymerizable composition.

Suitable examples of the carboxylic acid group-containing monofunctional (meth)acrylate include a compound represented by the Formula (I):

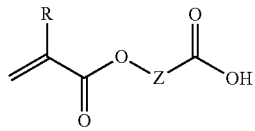

Formula (I),
wherein, R represents a hydrogen atom or a methyl group, preferably a hydrogen atom; and Z represents a divalent organic group.

Preferred examples of Z are *—(CH2)n-* [wherein n represents an integer of 2 to 12]; *—CH2-CH2-O—CO—Z'—* [wherein Z' represents a divalent organic group selected from the following]; *—C6H4-*; *—C6H4-(CH2)n-* [wherein n represents an integer of 1 to 12]; *—(CH2)n-C6H4-* [wherein n represents an integer of 1 to 12]; and *—(CH2)n-O—C6H4-* [wherein n represents an integer of 1 to 12]; and wherein * represents a linking site.

Preferred examples of the (meth)acrylate containing a carboxylic acid group are discloses in Table 2.

Preferred examples of the (meth)acrylate containing a phosphoric acid group are disclosed in Table 3.

TABLE 2

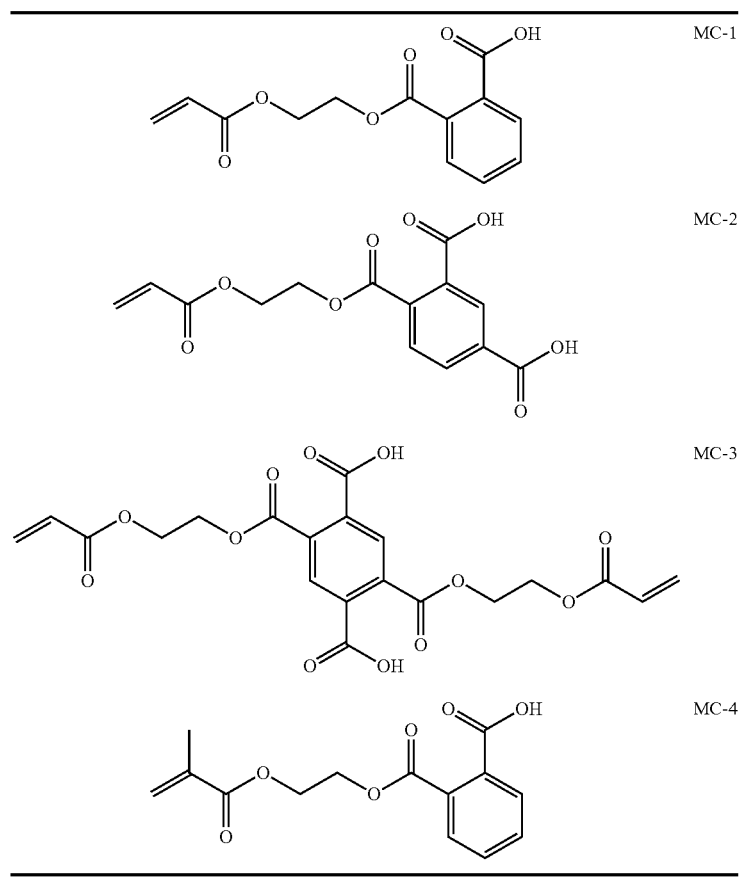

Preferred examples of the (meth)acrylate containing a phosphoric acid group or a phosphonic acid group include 2-(methacryloyloxy)ethyl phosphate, hydroxyethyl methacrylate phosphate, bis-(2-methacryloyl oxyethyl) phosphate.

Preferred examples of the (meth)acrylate containing a phosphoric acid group are compounds according to Formula P-1 or P-2:

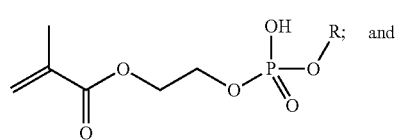

Formula P-1

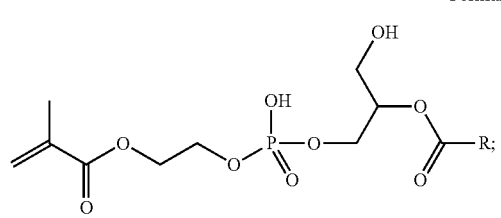

Formula P-2 wherein R represents $C_nH_{2n+1}$ with n representing an integer between 6 and 18.

TABLE 3

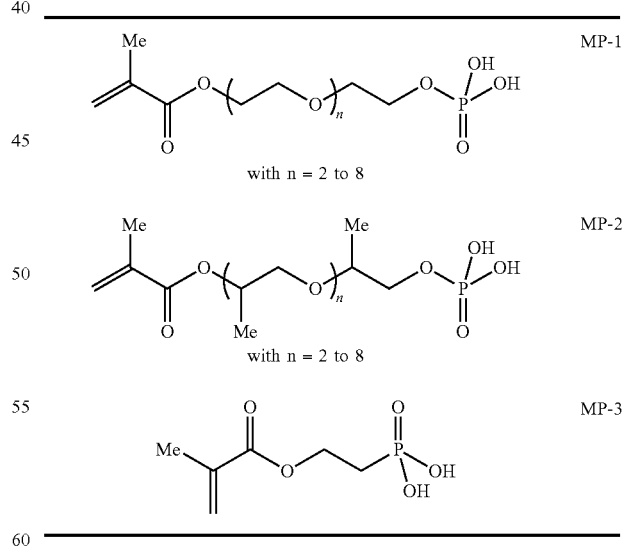

In a particularly preferred embodiment of the UV curable inkjet ink, the (meth)acrylate containing a carboxylic acid group, a phosphoric acid group, or a phosphonic acid group is selected from the group consisting of: 2-carboxyethyl acrylate, 2-acryloyl ethyl succinate, and 2-hydroxyethyl methacrylate phosphate.

Solubilizable UV Curable Inkjet Inks

In a third more preferred embodiment, the UV curable inkjet ink is solubilized by the stripping solution, meaning that no flakes have to be filtered of from the stripping solution like in the previous preferred embodiment.

A preferred UV curable inkjet ink for this third preferred embodiment contains
a) one or more photoinitiators; b) optionally a colorant preferably decolorizing at a pH of more than 10; c) one or more hydrolyzable polyfunctional monomer or oligomer having at least one alkali hydrolyzable group located in the atomic chain between two polymerizable groups of the polyfunctional monomer or oligomer; and d) one or more water absorption controlling monomers being a monofunctional or difunctional monomer containing at least one functional group selected from the group consisting of a hydroxyl group, an ethylene oxide or oligo-ethylene oxide group, a tertiary amine group, an acidic group having a $pK_a$ not lower than 3 and a five to seven membered aromatic or non aromatic heterocyclic group.

The hydrolyzable polyfunctional monomers or oligomers are responsible for the degradation of the cured inkjet ink pattern in the stripping solution resulting in the cured inkjet ink pattern being completely dissolved in the stripping solution. However, in order to obtain acceptable manufacturing times, a second monomer needs to be included. The water absorption controlling monomers are responsible for the swelling of the cured ink pattern in the stripping solution. This accelerates the dissolving of the cured ink pattern by the alkali present in the stripping solution.

In a preferred embodiment, the at least one alkali hydrolyzable group located in the atomic chain between two polymerizable groups of the polyfunctional monomer or oligomer is selected from the group consisting of Formulas H-1 to H-4:

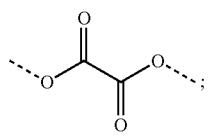
H-1

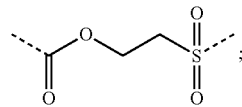
H-2

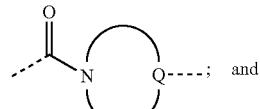
H-3

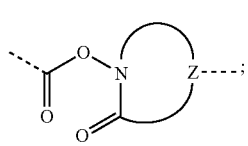
H-4 wherein
Q represents the necessary atoms to form a five membered aromatic ring group; Z represents the necessary atoms to form a five or six membered ring group; and the dashed lines represents the bonds to the rest of the polyfunctional monomer or oligomer.

In a further preferred embodiment, the at least one alkali hydrolyzable group H-3 is selected from the group consisting of an imidazole group, a benzimidazole group, a triazole group and a benzotriazole group.

In a further preferred embodiment, the at least one alkali hydrolyzable group H-4 is selected from the group consisting of an succinimide group and a phtalimid group.

In a particularly preferred embodiment, the at least one alkaline hydrolyzable group is an oxalate ester group.

The one or more hydrolyzable polyfunctional monomers or oligomers preferably contain polymerizable groups independently selected from the group consisting of an acrylate group, a methacrylate group, an acrylamide group, a methacrylamide group, a styrene group, a maleate group, a fumarate group, an itaconate group, a vinyl ether group, a vinyl ester group, an allyl ether group and an allyl ester group.

Typical examples of hydrolyzable polyfunctional monomers and oligomers having at least one alkali hydrolyzable group located in the atomic chain between two polymerizable groups of the polyfunctional monomers and oligomers are given in Table 4 without being limited thereto.

TABLE 4

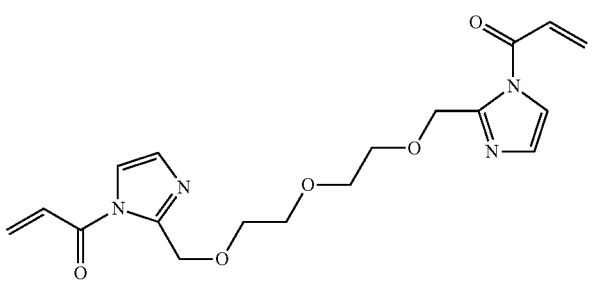 [SMILES: C=CC(=O)n1ccnc1COCCOCCOCc1nccn1C(=O)C=C]
Hydro-1

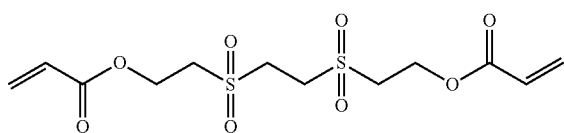 [SMILES: C=CC(=O)OCCS(=O)(=O)CCS(=O)(=O)CCOC(=O)C=C]
Hydro-2

TABLE 4-continued

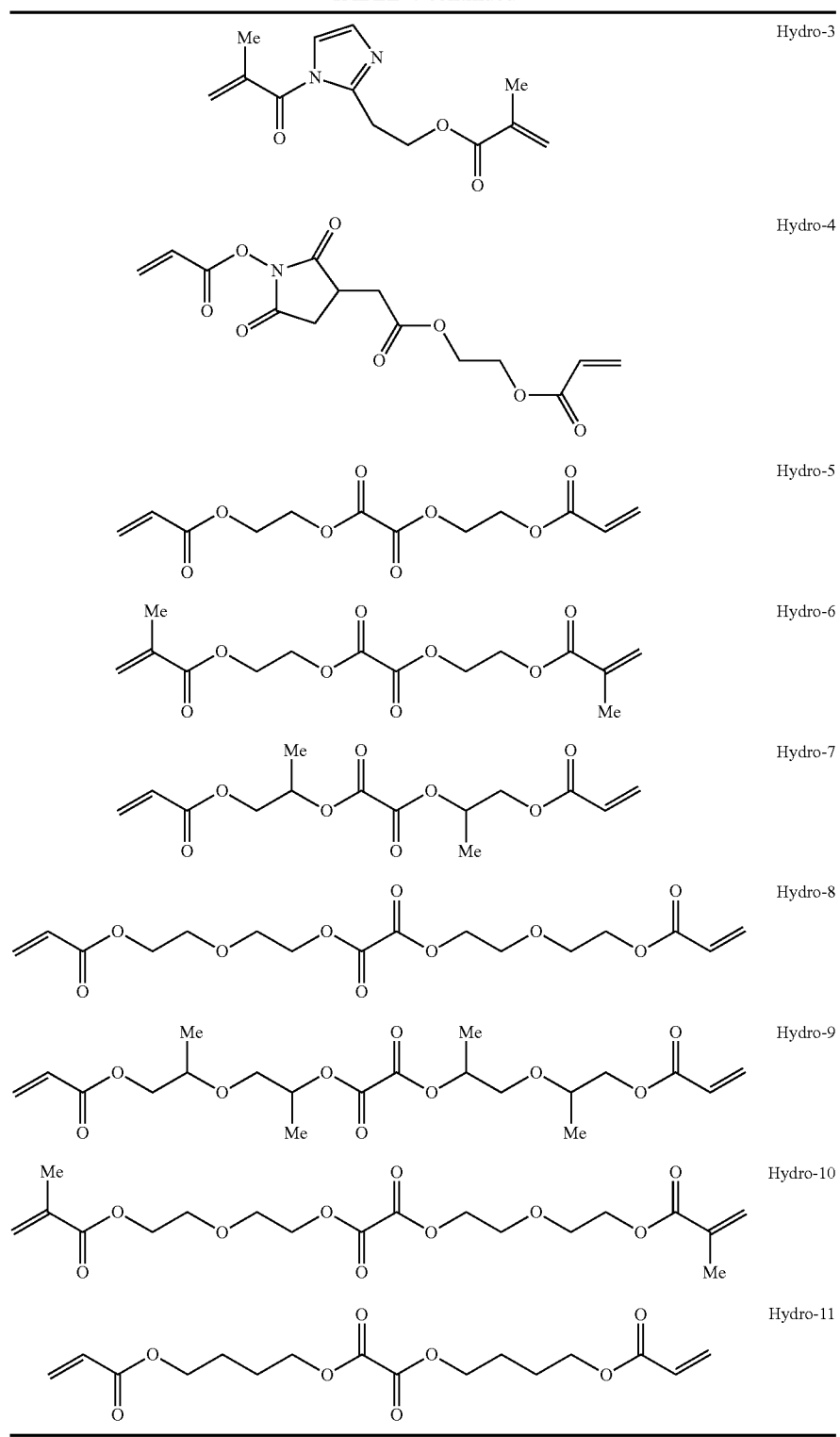

The one or more hydrolyzable polyfunctional monomers or oligomers having at least one alkali hydrolyzable group located in the atomic chain between two polymerizable groups of the polyfunctional monomer or oligomer is preferably present in the UV curable inkjet ink in an amount of at least 25 wt %, more preferably in an amount of at least 30 wt % based on the total weight of the UV curable inkjet ink.

The UV curable inkjet ink of the third preferred embodiment contains one or more water absorption controlling monomers. A water absorption controlling monomer is a monofunctional or difunctional monomer containing at least one functional group selected from the group consisting of a hydroxyl group, an ethylene oxide or oligo-ethylene oxide group, a tertiary amine, an acidic function having a $pK_a$ not lower then 3 and a five to seven membered aromatic or non aromatic heteroring.

In a preferred embodiment, the one or more water absorption controlling monomers contain at least one functional group selected from the group consisting of a hydroxyl group an ethylene oxide or oligo-ethylene oxide group, a carboxylic acid group, a phenolic group, five to seven membered lactam group and a morpholino group.

In the most preferred embodiment, the one or more water absorption controlling monomers contain at least one functional group selected from the group consisting of an ethylene oxide or oligo-ethylene oxide group, a hydroxyl group and a morpholino group.

The water absorption controlling monomer is preferably a monofunctional monomer.

The one or more water absorption controlling monomers preferably include a polymerizable group selected from the group consisting of an acrylate group, a methacrylate group, a acrylamide group and a methacrylamide group, The one or more water absorption controlling monomers preferably include a polymerizable group selected from the group consisting of an acrylate group and an acrylamide group.

Suitable water absorption controlling monomers are given in Table 5, without being limited thereto.

TABLE 5

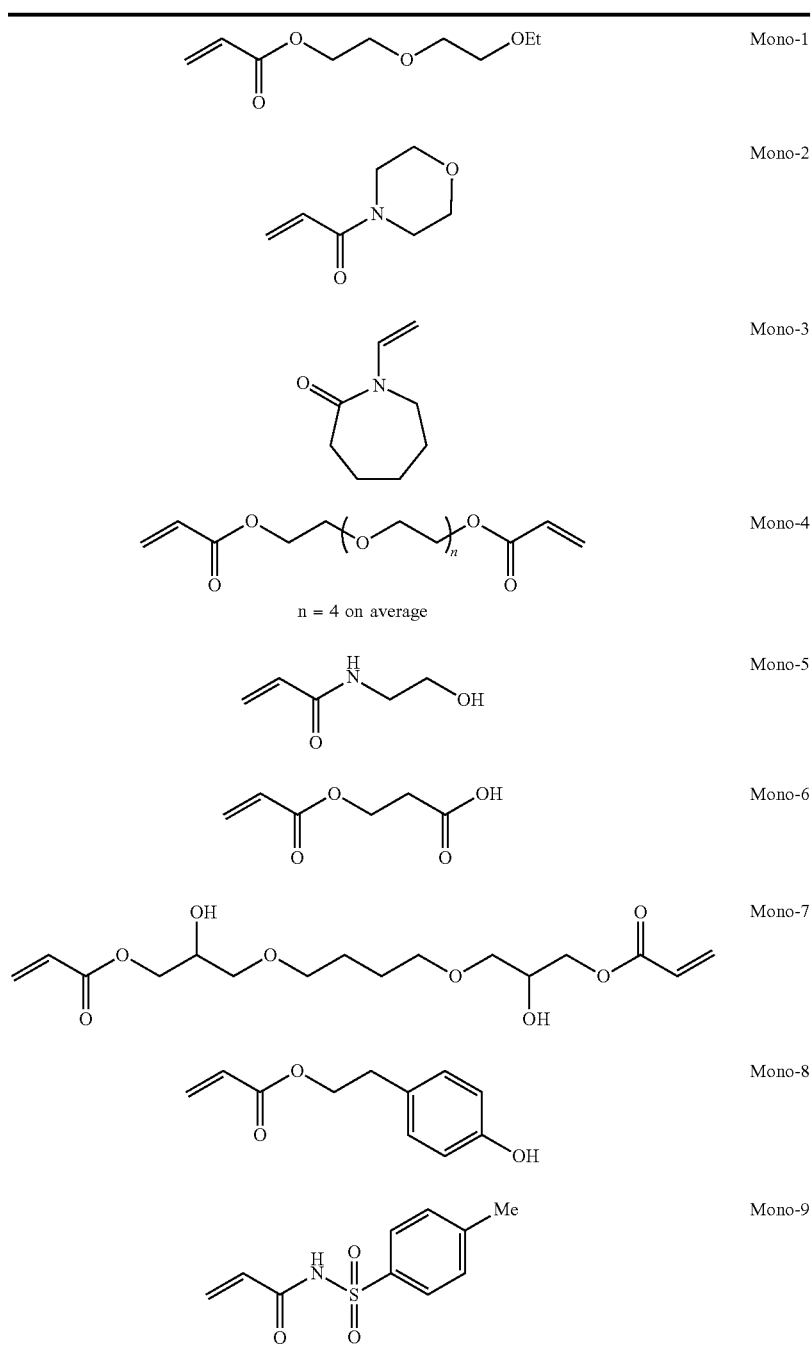

TABLE 5-continued

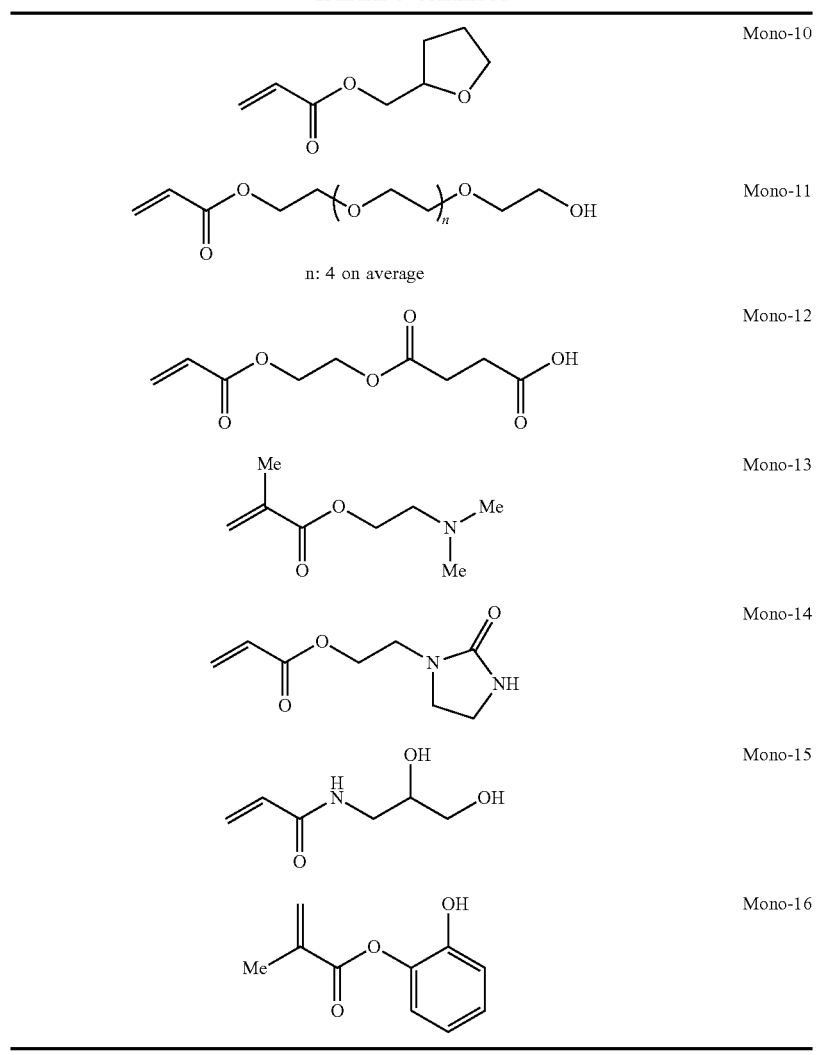

The one or more water absorption controlling monomers is preferably present in the UV curable inkjet ink in an amount of at least 20 wt % based on the total weight of the UV curable inkjet ink.

For reliable industrial inkjet printing, the viscosity of the UV curable inkjet inks is preferably no more than 20 mPa·s at 45° C., more preferably between 1 and 18 mPa·s at 45° C., and most preferably between 4 and 14 mPa·s at 45° C.

For good image quality and adhesion, the surface tension of the UV curable inkjet inks is preferably in the range of 18 mN/m to 70 mN/m at 25° C., more preferably in the range of about 20 mN/m to about 40 mN/m at 25° C.

Other Polymerizable Compounds

For the first preferred embodiment, where the UV curable inkjet ink is not stripped, there is no real limitation on the polymerizable composition as long as the inkjet ink is etch-resistant. It should be clear that an inkjet ink of the second and third preferred embodiment may also be used in a non-stripping manufacturing process.

The UV curable inkjet ink of the second preferred embodiment may contain other polymerizable compounds than the ones disclosed above. They may be present in the UV curable inkjet ink in an amount of 0 to 20 wt %, more preferably up to 15 wt % and most preferably in an amount of up to 10 wt % with all weight percentages (wt %) based on the total weight of the polymerizable composition.

The UV curable inkjet ink of the third preferred embodiment may also contain one or more other monomers and oligomers next to the one or more hydrolyzable polyfunctional monomers and oligomers and the one or more water absorption controlling monomers, but preferably the UV curable inkjet ink consists of one or more hydrolyzable polyfunctional monomers and oligomers and one or more water absorption controlling monomers.

The UV curable inkjet ink of the third preferred embodiment may contain one or more other monomers and oligomers, preferably present in the UV curable inkjet ink in an amount of no more than 25 wt %, more preferably no more than 15 wt % and most preferably in an mount of 0 to 10 wt % based on the total weight of the UV curable inkjet ink.

The other polymerizable compounds of the above described UV curable inkjet inks may be monomers and oligomers may possess different degrees of functionality, and a mixture including combinations of mono-, di-, tri- and higher functionality monomers, oligomers and/or prepolymers may be used. The viscosity of the UV curable inkjet ink can be adjusted by varying the ratio between the monomers and oligomers.

Particularly preferred other monomers and oligomers are those listed in [0106] to [0115] in EP 1911814 A (AGFA).

Colorants

The UV curable inkjet may be a substantially colourless inkjet ink, but preferably the UV curable inkjet ink includes at least one colorant. The colorant makes the temporary mask clearly visible to the manufacturer of embossing element, allowing a visual inspection of quality.

The colorant may be a pigment or a dye, but is preferably a dye that is not bleached by the UV curing step during the inkjet printing process of the UV curable inkjet ink. Generally dyes exhibit a higher light fading than pigments, but cause no problems on jettability. However, most preferably the colorant is a dye that survives the UV curing step in the inkjet printing process. A dye causes unlike pigments and dispersants usually no sludge in the etching and stripping solutions.

It was found that anthraquinone dyes exhibit only minor light fading under the normal UV curing conditions used in UV curable inkjet printing.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH 2004. ISBN 3527305769.

Suitable pigments are disclosed in paragraphs [0128] to [0138] of WO 2008/074548 (AGFA GRAPHICS).

Pigment particles in inkjet inks should be sufficiently small to permit free flow of the ink through the inkjet-printing device, especially at the ejecting nozzles. It is also desirable to use small particles for maximum colour strength and to slow down sedimentation. Most preferably, the average pigment particle size is no larger than 150 nm. The average particle size of pigment particles is preferably determined with a Brookhaven Instruments Particle Sizer BI90plus based upon the principle of dynamic light scattering.

In a particularly preferred embodiment, the colorant in the UV curable inkjet ink is an anthraquinone dye, such as Macrolex™ Blue 3R (CASRN 325781-98-4) from LANXESS.

Other preferred dyes include crystal violet and a copper phthalocyanine dye.

In a preferred embodiment, the colorant of the inkjet ink is a dye which decolorizes at a pH of more than 10.

In a preferred embodiment, the colorant is dissolved in the radiation curable inkjet ink, i.e. it is a dye. Compared to pigments, dyes allow much faster discolouration. They also do not cause problems of dispersion stability in the inkjet ink due to sedimentation.

In a first preferred embodiment the colorant is represented by the open form of a lactone based leuco dye. In a further preferred embodiment, the leuco dyes are leuco dyes according to Formula (I) to (VIII).

Formula (I)

wherein $R^1$ and $R^2$ are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; n and m independently represent an integer from 0 to 3; $R^3$ and $R^4$ are independently selected from the group consisting of a substituted or unsubstituted alkyl group, an alkoxy group and a halogen; $R^5$ is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group, a halogen, an alkoxy group, an ester, an amide, an amine and a carboxylic acid; and o represents an integer from 0 to 4.

Formula (II)

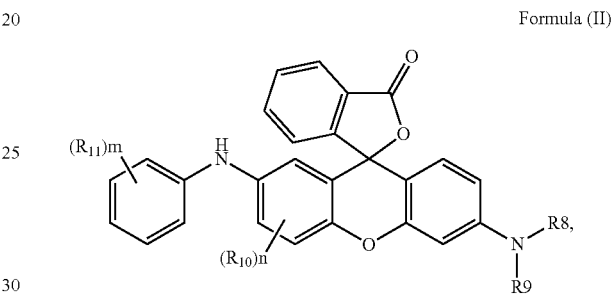

wherein R8 and R9 are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R10 and R11 are independently selected from a substituted or unsubstituted alkyl group, a substituted or unsubstituted alkenyl group and a substituted or unsubstituted alkynyl group; n represents an integer from 0 to 3; and m represents an integer from 0 to 5.

Formula (III)

wherein R12, R13, R16 and R17 are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R14 and R15 are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

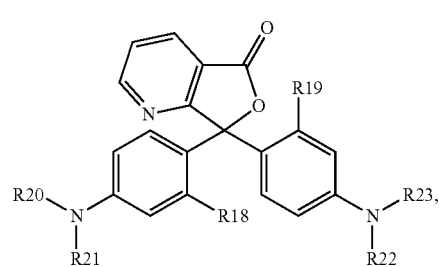

Formula (IV)

wherein R20 to R23 are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R18 and R19 are independently selected from the group consisting of a hydrogen, a substituted or unsubstituted alkyl group and an alkoxy group.

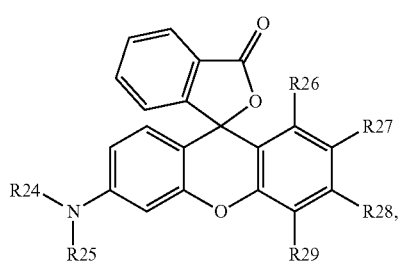

Formula (V)

wherein R24 and R25 are independently selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R26 to R29 are independently selected from the group consisting of a hydrogen, a substituted or unsubstituted alkyl group and a group formed by two of the groups R26 to R29 forming a substituted or unsubstituted aromatic ring.

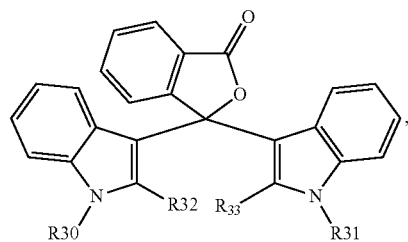

Formula (VII)

wherein R30 to R33 independently represent a group selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

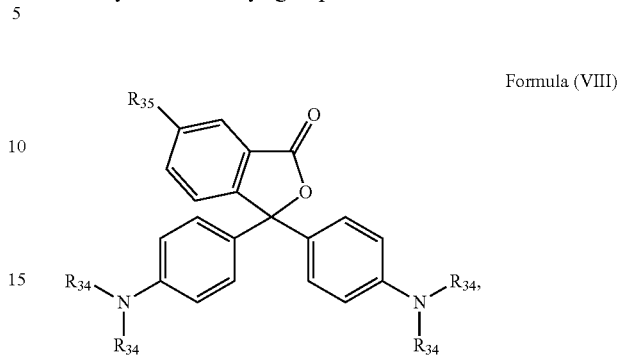

Formula (VIII)

wherein R34 is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R35 is selected from the group consisting of a hydrogen, an alkoxy group, a dialkylamino group, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

Typical examples of lactone based leuco dyes are given in Table 6 without being limited thereto.

TABLE 6

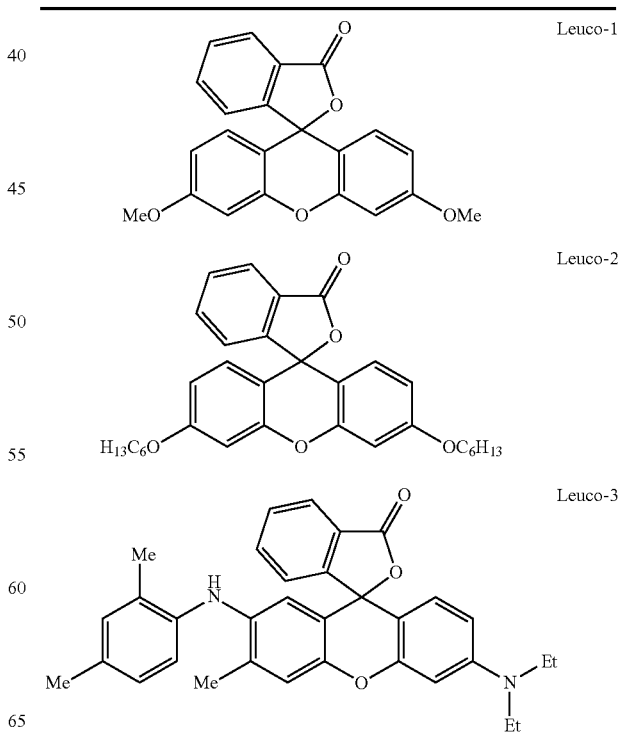

TABLE 6-continued

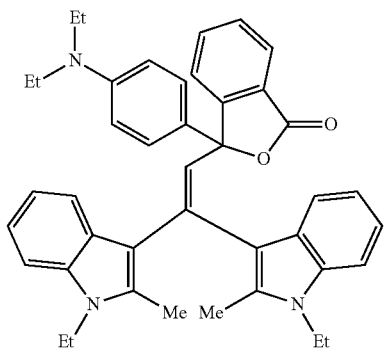 [SMILES: CCN(CC)c1ccc(C2(C=C(c3c(C)n(CC)c4ccccc34)c3c(C)n(CC)c4ccccc34)OC(=O)c3ccccc32)cc1]

Leuco-4

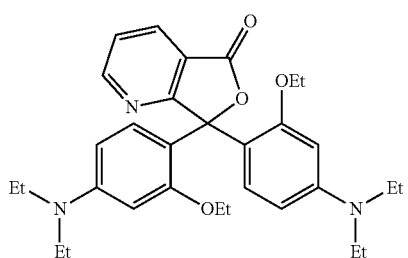 [SMILES: CCOc1cc(N(CC)CC)ccc1C1(c2ccc(N(CC)CC)cc2OCC)OC(=O)c2cccnc21]

Leuco-5

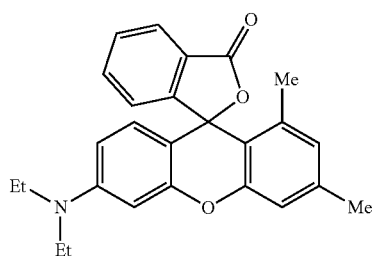 [SMILES: CCN(CC)c1ccc2c(c1)Oc1cc(C)cc(C)c1C21OC(=O)c2ccccc21]

Leuco-6

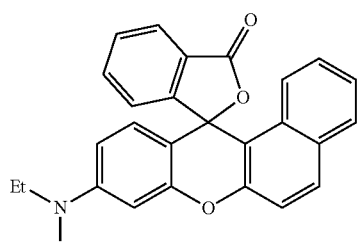

Leuco-7

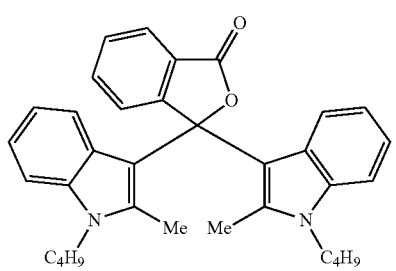

Leuco-8

TABLE 6-continued

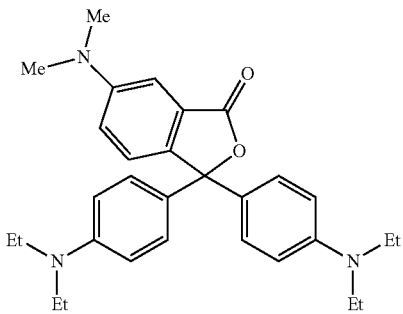 [SMILES: CCN(CC)c1ccc(C2(c3ccc(N(CC)CC)cc3)OC(=O)c3cc(N(C)C)ccc32)cc1]

Leuco-9

In a second preferred embodiment, the colorant is represented by a triaryl methane dye, more preferably a triaryl methane dye according to Formula (IX).

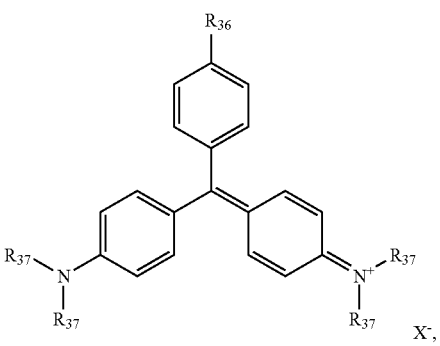

Formula IX wherein R36 is selected from the group consisting of a hydrogen, a dialkylamino group, diarylamino group, an alkylarylamino group, an alkoxy group, a halogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R37 is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; and X represents a counterion to compensate the positive charge. In a third preferred embodiment, the colorant is represented by a cyanine dye, a merocyanine dye and an oxonol dye. Cyanine dyes according to general formula (X) to (XIII) are particularly preferred.

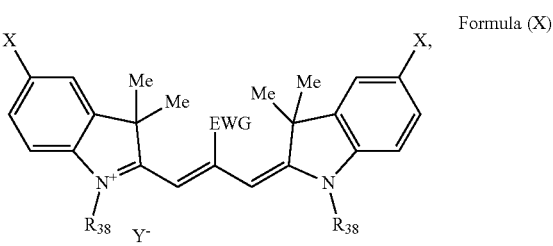

Formula (X)

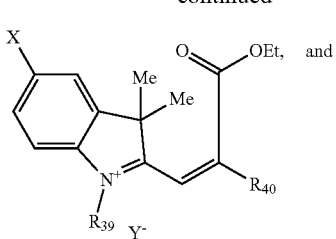

Formula (XI)

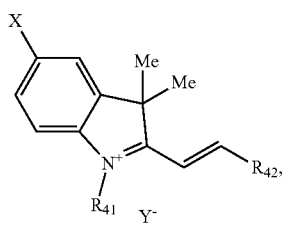

Formula (XII)

wherein X represents a group selected from a hydrogen, a nitrile, a nitro, a halogen and a sulfone; EWG represent an electron withdrawing group, preferably an ester group; R38, R39 and R41 independently represent a substituted or unsubstituted alkyl group; R40 and R42 are independently selected from the group consisting of a substituted or unsubstituted aryl group and a substituted or unsubstituted heteroaryl group; and Y represents a counterion to compensate the positive charge. Other preferred colorants are represented by Formula (XIII) and (XIV):

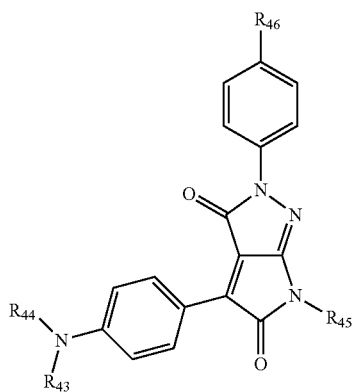

Formula (XIII)

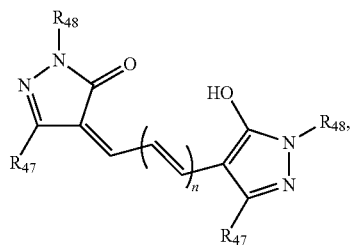

Formula (XIV)

wherein R43, R44 and R45 are independently selected from the group consisting of, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R46 is selected from the group consisting of a hydrogen, an alkoxy group, a halogen, a carboxy group or an ester thereof, a sulfonic acid or salt thereof, a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group; R47 is selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted aryl or heteroaryl group, an amino group, an amide group and a sulphonamide group; R48 is selected from the group consisting of a substituted or unsubstituted alkyl group, a substituted or unsubstituted alkenyl group, a substituted or unsubstituted alkynyl group, a substituted or unsubstituted alkaryl group, a substituted or unsubstituted aralkyl group and a substituted or unsubstituted aryl or heteroaryl group.

In a particularly preferred embodiment, the colorant comprises at least on substituent, capable of compatibilizing the colorant or its decolorized form with an aqueous stripping solution. This substituent capable of compatibilizing said colorant or its decolorized form is preferably selected from the group consisting of a carboxylic acid or salt thereof, a sulfonic acid or salt thereof, a phosphonic acid or salt thereof, a half ester of sulphuric acid or salt thereof, a mono- or diester of phosphoric acid or salt thereof, a phenolic group, an ethylene oxide group and a hydroxyl group, a carboxylic acid, a hydroxyl group and an ethylene oxide group being particularly preferred.

Typical colorants according to Formula (IX) to (XIV) are given in Table 7 without being limited thereto.

TABLE 7

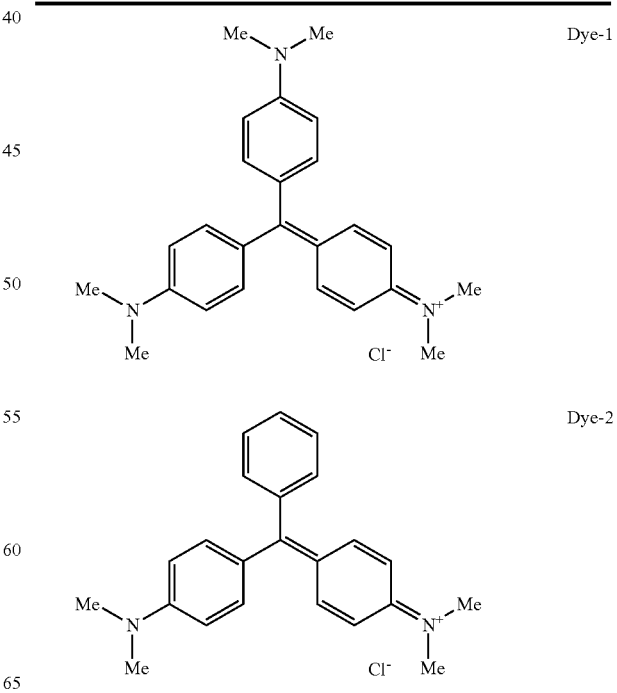

TABLE 7-continued

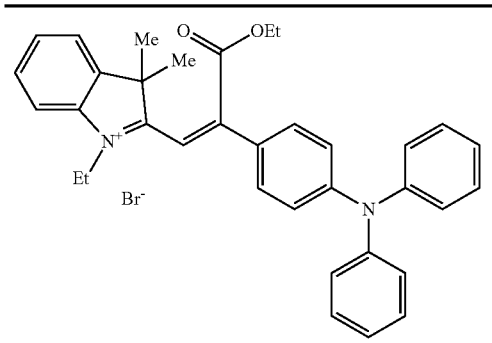
Dye-3

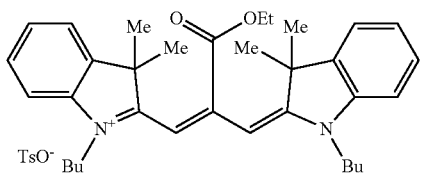
Dye-4

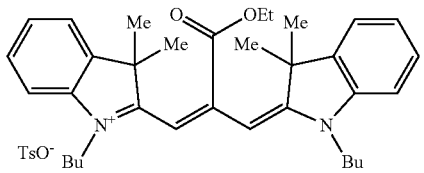
Dye-5

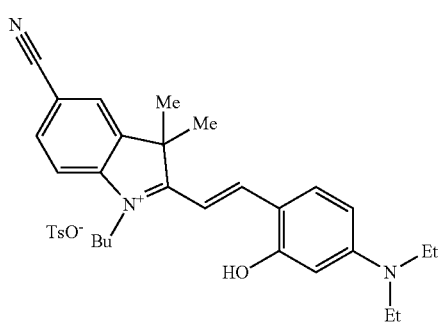
Dye-6

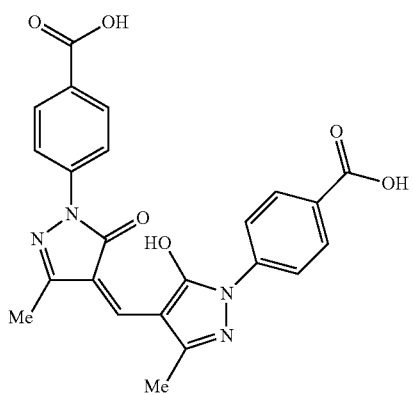 [SMILES: CC1=NN(c2ccc(C(=O)O)cc2)C(=O)/C1=C\c1c(C)nn(-c2ccc(C(=O)O)cc2)c1O]
Dye-7

TABLE 7-continued

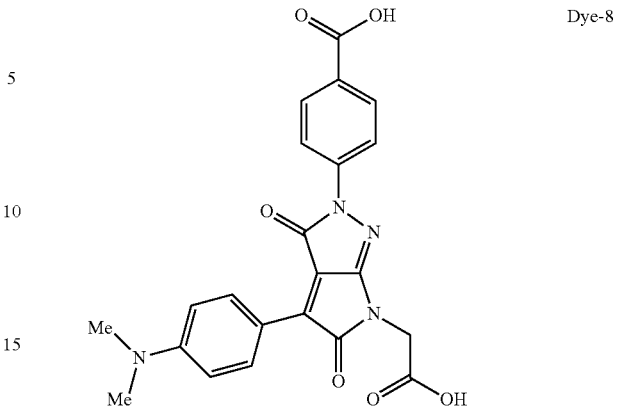
Dye-8

The colorant is present in the UV curable inkjet ink in an amount sufficient to impair visible colour to the cured ink pattern. In a preferred embodiment, the colorant is present in an amount of 0.1 to 6.0 wt %. For a dye, usually an amount of less than 2 wt %, more preferably less than 1 wt % based on the total weight of the UV curable inkjet ink suffices.

Polymeric Dispersants

If the UV curable inkjet ink contains a colour pigment, then the UV curable inkjet ink preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically to and to, in EP 1911814 A (AGFA).

Commercial examples of polymeric dispersants are the following:

- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Photoinitiators and Photoinitiating Systems

The UV curable inkjet ink contains at least one photoinitiator, but may contain a photoinitiating system including a plurality of photoinitiators and/or co-initiators.

The photoinitiator in the UV curable inkjet ink is preferably a free radical initiator, more specifically a Norrish type I initiator or a Norrish type II initiator. A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzyl dimethylketal, bis (2,6-dimethylbenzoyl)-2,4,4-trimethylpentylphosphine oxide, 2,4,6 trimethylbenzoyldiphenylphosphine oxide, 2,4,6-trimethoxybenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

The photoinitiator is preferably a so-called diffusion hindered photoinitiator. A diffusion hindered photoinitiator is a photoinitiator which exhibits a much lower mobility in a cured ink layer than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator for the UV curable inkjet ink is preferably selected from the group consisting of non-polymeric multifunctional photoinitiators, oligomeric or polymeric photoinitiators and polymerizable photoinitiators. Most preferably the diffusion hindered photoinitiator is a polymerizable initiator or a polymeric photoinitiator.

A preferred diffusion hindered photoinitiator contains one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A preferred diffusion hindered photoinitiator contains one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2065362 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

A preferred amount of photoinitiator is 0.1-20 wt %, more preferably 2-15 wt %, and most preferably 3-10 wt % of the total weight of the UV curable inkjet ink.

In order to increase the photosensitivity further, the UV curable inkjet ink may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The preferred co-initiators are aminobenzoates.

When one or more co-initiators are included into the UV curable inkjet ink, preferably these co-initiators are diffusion hindered.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth)acrylate group, more preferably having at least one acrylate group.

The UV curable inkjet ink preferably includes a polymerizable or polymeric tertiary amine co-initiator.

Preferred diffusion hindered co-initiators are the polymerizable co-initiators disclosed in EP 2053101 A (AGFA) in paragraphs [0088] and [0097].

The UV curable inkjet inks preferably includes the (diffusion hindered) co-initiator in an amount of 0.1 to 20 wt %, more preferably in an amount of 0.5 to 15 wt %, most preferably in an amount of 1 to 10 wt % of the total weight of the UV curable inkjet ink.

Polymerization Inhibitors

The UV curable inkjet ink may contain at least one inhibitor for improving the thermal stability of the ink.

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol, 2,6-di-tert.butyl-4-methylphenol (=BHT) may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™18 and Genorad™ 20 from Rahn AG; Irgastab™UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

The inhibitor is preferably a polymerizable inhibitor.

Since excessive addition of these polymerization inhibitors may lower the curing speed, it is preferred that the amount capable of preventing polymerization is determined prior to blending. The amount of a polymerization inhibitor is preferably lower than 5 wt %, more preferably lower than 3 wt % of the total UV curable inkjet ink.

Surfactants

The UV curable inkjet ink may contain at least one surfactant, but preferably no surfactant is present. If no surfactant is present, the UV curable inkjet ink does not spread well on the metal surface allowing the generation of thin lines.

The surfactant can be anionic, cationic, non-ionic, or zwitter-ionic and is usually added in a total quantity less than 1 wt % based on the total weight of the UV curable inkjet ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoric surfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferably the surfactant is present in the UV curable inkjet ink in an amount of 0 to 0.05 wt % based on the total weight of the UV curable inkjet ink.

Inkjet Printing Devices

The UV curable inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the metal plate. In a single pass printing process the inkjet print heads usually remain stationary and the metal plate is transported under the inkjet print heads.

Curing Devices

The UV curable inkjet ink can be cured by exposing them to actinic radiation, such as electron beam or ultraviolet radiation, preferably the decorative pattern of UV curable inkjet ink is cured by ultraviolet radiation, more preferably using UV LED curing.

In inkjet printing, the curing means may be arranged in combination with the print head of the inkjet printer, travelling therewith so that the curable liquid is exposed to curing radiation very shortly after been jetted.

In such an arrangement, with the exception of UV LEDs, it can be difficult to provide a small enough radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the UV curable inkjet ink is cured by UV LEDs. The inkjet printing device preferably contains one or more UV LEDs preferably with a wavelength larger than 360 nm, preferably one or more UV LEDs with a wavelength larger than 380 nm, and most preferably UV LEDs with a wavelength of about 395 nm.

Furthermore, it is possible to cure the ink pattern using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Example

Materials

All materials used in the following examples were readily available from standard sources such as ALDRICH CHEMICAL Co. (Belgium) and ACROS (Belgium) unless otherwise specified. The water used was deionized water.

SR606A is neopentylglycol hydroxypivalate diacrylate available as Sartomer™ SR606A from ARKEMA.

ACMO is acryloyl morpholine available from RAHN.

CEA is 2-carboxyethyl acrylate from ALDRICH.

CN146 is a polyester acrylate oligomer available as Sartomer™ CN146 from ARKEMA.

CN823 is an acrylic oligomer alavailable as Sartomer™ CN823 from ARKEMA.

INHIB is a mixture forming a polymerization inhibitor having a composition:

TABLE 8

| Component | wt % |
|---|---|
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminum N-nitrosophenylhydroxylamine from WAKO CHEMICALS LTD.

Dye-1 is a blue anthraquinone dye available as Macrolex™ Blue 3R from LANXESS.

Crystal violet is a triarylmethane dye from ALDRICH.

ITX is an isomeric mixture of 2- and 4-isopropylthioxanthone available as Darocur™ ITX from BASF.

EPD is ethyl 4-dimethyaminobenzoate available as Genocure™ EPD from RAHN.

TPO is 2,4,6-trimethylbenzoyl-diphenyl-phosphineoxide, a photoinitiator available as Darocur™ TPO from BASF.

IC907 is 2-methyl-1-[4-(methylthio)phenyl]-2-morpholino-propan-1-one, a photoinitiator available as Irgacure™ 907 from BASF.

IC819 is bis(2,4,6-trimethylbenzoyl)-phenylphosphineoxide, a photoinitiator available as Irgacure™ 819 from BASF.

VEEA or 2-(2-vinyloxy-ethoxy)-ethyl acrylate was supplied by Nippon Shokubai.

4-hydroxybutyl acrylate was supplied by Nippon Kasei.

PETA is pentaerythritol tetraacylate available as SR295 from SARTOMER.

PEG200DA is polyethylene glycol (MW200) diacrylate available as Sartomer™ SR259 from SARTOMER having n=4:

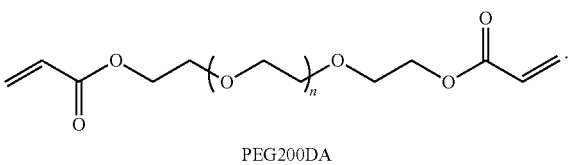

PEG200DA

HDDA is 1,6-hexanediol diacrylate available as Sartomer™ SR238 from SARTOMER:

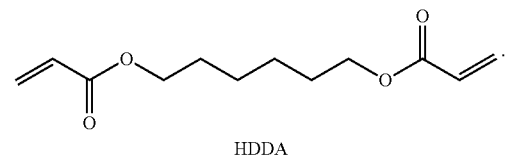 [SMILES: C=CC(=O)OCCCCCCOC(=O)C=C ; "HDDA"]

HDDA

HYDRO-8 is an oxalate monomer similar to PEG200DA:

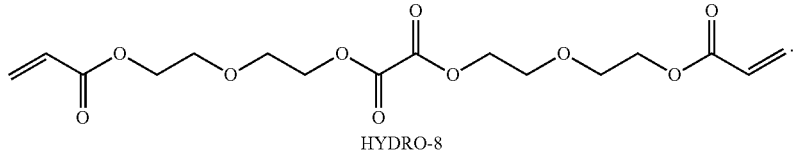

HYDRO-8

The synthesis of oxalic acid bis-[2-(2-acryloyloxy-ethoxy)-ethyl]ester (HYDRO-8) was performed as follows.

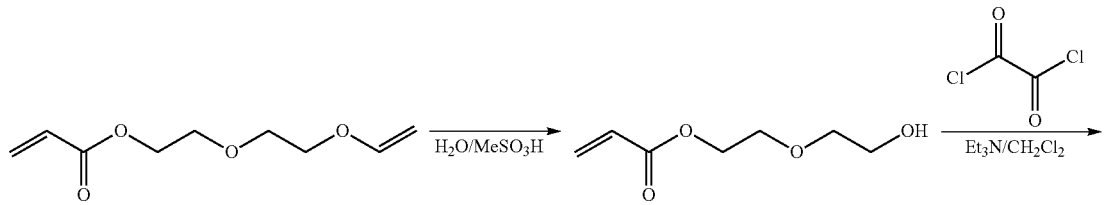

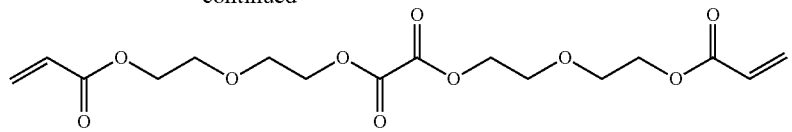

First Step: Synthesis of 2-(2-hydroxy-ethoxy)-ethyl acrylate 55.9 g (0.3 mol) 2-(2-vinyloxy-ethoxy)-ethyl acrylate was dissolved in 100 ml acetone. 27 g (1.5 mol) water and 0.6 g (6 mmol) methane sulfonic acid was added. The reaction was allowed to continue for 4 hours at room temperature. The reaction mixture was diluted with 500 ml methylene chloride and extracted with 250 ml water. The organic fraction was dried over $MgSO_4$ and evaporated under reduced pressure. 2-(2-hydroxy-ethoxy)-ethyl acrylate was analyzed using TLC-chromatography (Partisil KC18F, supplied by Whatman, eluent: methanol/0.5 N NaCl 80/20, $R_f$ 0.83, only traces of (2-vinyloxy-ethoxy)-ethyl acrylate, $R_f$: 0.66 and a compound according to the following structure, $R_f$ 0.9).

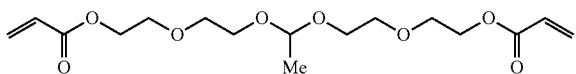 [SMILES: C=CC(=O)OCCOCCOC(C)OCCOCCOC(=O)C=C]

2-(2-hydroxy-ethoxy)-ethyl acrylate was used without further purification.

Second Step: Synthesis of Oxalic Acid bis-[2-(2-acryloyloxy-ethoxy)-ethyl]ester 30.4 g (0.19 mol) of 2-(2-hydroxy-ethoxy)-ethyl acrylate, 19.8 g (0.196 mol) triethyl amine and 1.3 g (5.7 mmol) BHT were dissolved in 140 ml methylene chloride. The solution was cooled to −10° C. A solution of 12.1 g (0.095 mol) oxalyl chloride in 70 ml methylene chloride was added drop wise, while maintaining the temperature at −10° C. The reaction was allowed to continue for 1 hour at 0° C., followed by reaction at room temperature for 16 hours. The reaction mixture was added to 200 g ice and the mixture was extracted with 200 ml methylene chloride. The organic fraction was extracted with 200 ml of a 1N hydrochloric acid solution, 200 ml of a saturated $NaHCO_3$ solution and 200 ml of brine. The organic fraction was dried over $MgSO_4$ and evaporated under reduced pressure. The crude product was purified, using preparative column chromatography using a Prochrom LC80 column, packed with packed with Kromasil Si 60å 10 μm and methylene chloride/ethyl acetate 90/10 as eluent. 19.1 g of oxalic acid bis-[2-(2-acryloyloxy-ethoxy)-ethyl]ester was isolated (y: 54%). The compound was analyzed using TLC-chromatography (TLC Silica gel 60 $F_{254}$, supplied by Merck, eluent: methylene chloride/ethyl acetate, 83/17, $R_f$: 0.42) and LC-MS, according to the method described below (retention time 6.6 min, purity 96.2 area %).

HYDRO-11 is an oxalate monomer similar to HDDA:

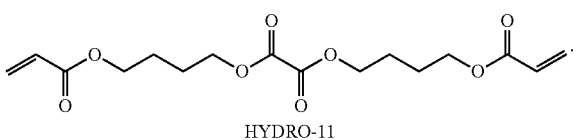 [SMILES: C=CC(=O)OCCCCOC(=O)C(=O)OCCCCOC(=O)C=C ; "HYDRO-11"]

HYDRO-11

The synthesis of oxalic acid bis-(4-acryloyloxy-butyl)ester (HYDRO-11) was performed as follows.

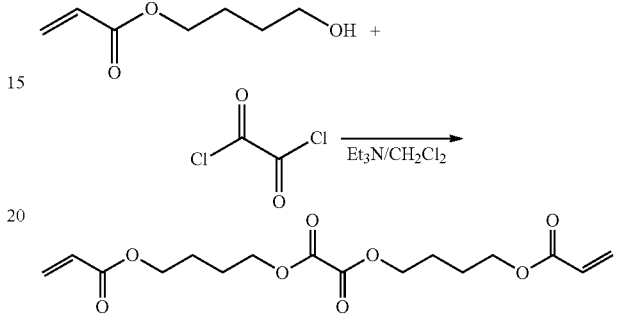

51.3 g (0.3 mol) 4-hydroxy-butyl acrylate, 31.4 g (0.31 mol) triethyl amine and 2 g (9 mmol) BHT were dissolved in 200 ml methylene chloride. The reaction mixture was cooled to −10° C. A solution of 19.0 g (0.15 mol) oxalyl chloride in 100 ml methylene chloride was added drop wise while maintaining the temperature at −10° C. The reaction was allowed to continue for 1 hour at 0° C., followed by reaction at room temperature for 16 hours. The reaction mixture was poured into 500 g ice and the mixture stirred for 1 hour. The mixture was extracted twice with 200 ml methylene chloride. The pooled organic fractions were extracted with 300 ml of a 1 N hydrochloric acid solution, 300 ml of a saturated $NaHCO_3$ solution and twice with 200 ml of brine. The organic fraction was dried over $MgSO_4$ and evaporated under reduced pressure. The crude product was purified, using preparative column chromatography using a Prochrom LC80 column, packed with packed with Kromasil Si 60å 10 μm and methylene chloride/ethyl acetate 90/10 as eluent. 22 g of oxalic acid bis-(4-acryloyloxy-butyl)ester was isolated (y: 43%). The compound was analyzed, using TLC chromatography (TLC Silica gel 60 $F_{254}$, supplied by Merck, eluent: methylene chloride/ethyl acetate 96/4, $R_f$: 0.3), GC (retention time: 12.2 min, purity: 99.6 area %), and GC-MS, both according to the method described below.

DPGDA is dipropylene glycol diacrylate available as Sartomer™ SR508 from SARTOMER.

MADAME is N,N-dimethyl 2-aminoethyl methacrylate available as Norsocryl™ MADAME from ARKEMA France.

ACMO is acryloyl morpholine available from RAHN.

VEEA or 2-(2-vinyloxy-ethoxy)-ethyl acrylate was supplied by Nippon Shokubai.

IDA is isodecylacrylate available as Sartomer™ SR395 from SARTOMER.

TMPTA is trimethylolpropane triacrylate available as Sartomer™ SR350 from SARTOMER.

NPGDA is neopentylglycol (2× propoxylated) diacrylate available as Sartomer™ SR9003 from SARTOMER PETA is penta erythritol tetraacrylate available as Sartomer 295 from Sartomer.

CEA is 2-carboxyethyl acrylate from ALDRICH.

SR9054 is 2-hydroxyethyl methacrylate phosphate available as Sartomer™ SR9054 from SARTOMER.

Measurement Methods

1. GC Analysis

The GC analysis was done on an Agilent 6890, using a DB1 column (30×0.25 0.25), helium as carrier gas at a flow rate of 2 ml/min and a split ratio of 50 to 1. A temperature profile was used, starting at 40° C. for 2 minutes and a temperature increase of 15° C. per minute up to a temperature of 200° C. 1 µl of a 1 w/w % solution of each compound in methylene chloride was injected.

2. GC-MS Analysis

The GC-MS analysis was done on a Trace Ultra-DSQ, using a DB-xlb column (30×0.25 0.25), helium as carrier gas at a flow rate of 1.2 ml/min and a split ratio of 50 to 1. A temperature profile was used starting at 80° C. and a temperature increase of 15° C. per minute up to 325° C. EI an $PCI_{(ammonia)}$ was used for recording the mass spectra. 1 µl of a 1 w/w % solution of each compound in methylene chloride was injected.

3. LC-MS Analysis

The LC-MS analysis was done on a Bruker HG Ultra, using an Altima HP C18 AQ column (150×3, 5 µm), operating at a flow rate of 0.35 ml/min and at 40° C. A gradient elution was used, with water as eluent A and acetonitrile as eluent B. The gradient according to Table 9 was used.

TABLE 9

| Time | % B |
|---|---|
| 0 | 45 |
| 6 | 45 |
| 11 | 100 |
| 30 | 100 |
| 31 | 45 |
| 38 | 45 |

ESI ionisation was used in combination with a combibron detector. 5 µl of a solution of 2 mg of each compound in 20 ml acetonitrile was injected.

4. Flow Injection-MS

The flow injection analysis was done on a Bruker HG Ultra, using a mixture of 95% acetonitrile and 5% of 2 mmol ammonium acetate solution in water as eluent at a flow rate of 0.1 ml/min and a temperature of 40° C. ESI negative was used as ionisation. 2 µl of a solution of 2 mg of each compound in 20 ml acetonitrile was injected.

5. Etch Resistance (ER %)

The etch resistance was evaluated by the determining the percentage of the cured inkjet ink layer that remained on the copper plate after etching. An etch resistance of 100% means that the whole cured inkjet ink layer survived the etching bath. An etch resistance of 0% means that no cured inkjet ink could be found to be present on the copper plate after etching. An intermediate percentage, e.g. 80% means that about 80% of the cured inkjet ink could be found to be present on the copper plate after etching. A good etch resistance means a value of at least 80%. Excellent etch resistance means a value of at least 90% but preferably 100%.

6. Etch Resistance (ER)

The etch resistance was evaluated by rubbing a cotton bud over the layer immediately after etching and rinsing. Evaluation was made in accordance with a criterion described in Table 10.

TABLE 10

| Evaluation | Criterion |
|---|---|
| OK | Layer not damaged |
| Not OK | Layer damaged |

7. Strippability (SB) and Flakes

The time of release of the UV curable inkjet printed layer from the metal surface, i.e. the release time, was measured. Evaluation was made in accordance with a criterion described in Table 11.

TABLE 11

| Evaluation | Criterion |
|---|---|
| OK | Release time of less than 5 minutes |
| Moderate | Release time of 5 to 10 minutes |
| Not OK | Release time of more than 10 minutes |

Once the release of the UV curable inkjet printed layer started, the formation of flakes was observed. Evaluation was made in accordance with a criterion described in Table 12.

TABLE 12

| Evaluation | Criterion |
|---|---|
| OK | Flake formation within 5 minutes |
| Moderate | Flake formation within 8 minutes |
| Not OK | No break-down of the inkjetted layer within 20 minutes |

8. Strippability (SB %)

The strippability was evaluated by the determining the percentage of the UV cured inkjet ink layer that was removed from the metal surface after stripping. A strippability of 100% means that the whole cured inkjet ink layer was removed. A strippability of 0% means that no cured inkjet ink could be removed from the metal plate. An intermediate percentage, e.g. 30% means that only about 30% of the cured inkjet ink could be removed from the metal plate by stripping. A good strippability means a value of at least 80%. Excellent strippability means a value of at least 90% but preferably 100%. A value of 30% or less is a very poor strippability.

9. Adhesion (ADH)

For testing adhesion, a cross hatch cutter set Elcometer 1542 was used. The distance between the applied scratches is 1 mm. A 5 cm long strip of Tesatape™ 4104 PVC tape was pressed on to the cross cut inkjet ink. The tape was pressed four times with the thumb before removing it in one sharp pull. The adhesion was then evaluated in accordance with the evaluation values described in Table 13.

TABLE 13

| Evaluation value | Observation |
|---|---|
| 0 | Nothing removed, perfect adhesion. |
| 1 | Detachment of only very small parts of the inkjek ink coating, almost perfect adhesion. |

TABLE 13-continued

| Evaluation value | Observation |
| --- | --- |
| 2 | Minor parts of the inkjet ink coating was removed by the tape, good adhesion |
| 3 | Parts of the inkjet ink coating were removed by the tape, poor adhesion. |
| 4 | Most of the inkjet ink coating was removed by the tape, poor adhesion. |
| 5 | The inkjet ink was completely removed from the substrate by the tape, no adhesion. |

10. Viscosity

The viscosity of the formulations was measured at 45° C. using a "Robotic Viscometer Type VISCObot" from CAMBRIDGE APPLIED SYSTEMS.

For industrial inkjet printing, the viscosity is preferably less than 20 mPa·s at 45° C. More preferably the viscosity is less than 15 mPa·s at 45° C.

11. Cure Speed

After printing and curing on the metal surface, the UV cured inkjet ink layer was evaluated by touch of a finger. Evaluation was made in accordance with a criterion described in Table 14.

TABLE 14

| Evaluation | Criterion |
| --- | --- |
| OK | Layer feels not tacky |
| Not OK | Layer feels tacky or even wet |

Example 1

This example illustrates the manufacturing of an embossing plate using UV curable inkjet ink printing, wherein after etching the UV cured pattern is stripped into flakes.

Preparation of the UV Curable Inkjet Inks

The UV curable inkjet inks Ink-1 to Ink-3 were prepared according to Table 15. The weight percentages (wt %) were all based on the total weight of the UV curable inkjet ink. The viscosity was measured at 25° C. at a shear rate of 1,000 $s^{-1}$.

TABLE 15

| wt % of component: | Ink-1 | Ink-2 | Ink-3 |
| --- | --- | --- | --- |
| SR606A | 40.00 | 42.55 | 41.05 |
| ACMO | 41.05 | 37.50 | 36.00 |
| CEA | 4.95 | 3.00 | 3.00 |
| CN146 | — | 4.00 | — |
| CN823 | — | — | 7.00 |
| INHIB | 1.00 | 1.00 | 1.00 |
| ITX | 4.00 | 4.00 | 4.00 |
| TPO | 4.00 | 2.95 | 2.95 |
| EPD | 4.00 | 4.00 | 4.00 |
| Dye-1 | 1.00 | 1.00 | 1.00 |
| Viscosity (25° C.) | 23 mPa · s | 26 mPa · s | 30 mPa · s |

Evaluation and Results

Stainless steel 316L plates of 1 mm thickness were cleaned for 10 seconds at 25° C. with a solution called Mecbrite™ CA-95 MH from MEC Europe. The plates were then rinsed with a water jet for 90 seconds.

On a first stainless steel plate, a pattern of the UV curable inkjet inks INK-1 to INK-3 was printed by means of an Anapurna™ MV inkjet printer equipped with Konica Minolta 512 print heads at 14 pL drop volume in 8 passes (1440×720 dpi) and cured by means of a Hg lamp with an output of 550 mJ/cm².

On a second stainless steel plate, the same pattern was printed with the UV curable inkjet inks INK-1 to INK-3 at double thickness by the Anapurna™ MV inkjet printer.

The third stainless steel plate was prepared in the same way as the first stainless steel plate, except that an additional heat treatment of 30 minutes at 150° C. was given.

The plates were subjected to an acidic etch bath ("Mega" acid etchant obtained from Mega Electronics, pH 2, contains $FeCl_3$) for 15 minutes at 50° C. The plates were subsequently rinsed for 90 seconds with water and dried. An evaluation of the etch resistance and adhesion was then made.

The etched stainless steel plates were then subjected for 5 minutes at 50° C. to an alkaline strip bath (containing 5% NaOH), then rinsed for 90 seconds with water and dried, and evaluated for strippability and the shape of the stripped ink layer. The relief height was measured by subtracting the thickness of an etched area from an area that was protected by the UV curable inkjet ink. The plates were weighed before and after etching so that the percentage of mass loss by etching could be calculated. The results are shown in Table 16.

TABLE 16

| Plate | Ink | Etching Temp. | Etching ADH | Etching ER % | Stripping SB | Stripping Flakes | Relief Height | % mass loss |
| --- | --- | --- | --- | --- | --- | --- | --- | --- |
| 1 | Ink-1 | 50° C. | 5 | 50 | OK | OK | 245 µm | 16% |
|   | Ink-2 |   | 5 | 80 | OK | OK | 277 µm |   |
|   | Ink-3 |   | 5 | 70 | OK | OK | 309 µm |   |
| 2 | Ink-1 | 50° C. | 5 | 100 | OK | OK | 221 µm | 17% |
|   | Ink-2 |   | 5 | 100 | OK | OK | 220 µm |   |
|   | Ink-3 |   | 5 | 100 | OK | OK | 214 µm |   |
| 3 | Ink-1 | 50° C. | 0 | 100 | OK | OK | 197 µm | 13% |
|   | Ink-2 |   | 0 | 95 | OK | OK | 208 µm |   |
|   | Ink-3 |   | 1 | 90 | OK | OK | 208 µm |   |

From Table 16, it can be seen that after only 15 minutes of etching a relief of about 200 to 300 µm could be created. It can also be seen that inkjet printing the UV curable inkjet ink as a thicker layer increases the etch resistance. Furthermore, it can also be seen that an additional heat treatment of 30 minutes at 150° C. improves the adhesion of the ink layer to the metal surface.

Example 2

This example illustrates UV curable inkjet ink printing, wherein after etching the UV cured pattern is stripped and solubilised. This avoids the necessity to filter out flakes of the cured ink pattern.

Preparation of the UV Curable Inkjet Inks

The UV curable inkjet ink C-1 and C-2 and I-1 to I-3 were prepared according to Table 17. The weight percentage (wt %) was based on the total weight of the UV curable inkjet ink. The UV curable inkjet ink C-1 lacks a hydrolyzable polyfunctional monomer or oligomer, while the UV curable inkjet ink C-2 lacks a water absorption controlling monomer.

TABLE 17

| wt % of component: | C-1 | C-2 | I-1 | I-2 | I-3 |
| --- | --- | --- | --- | --- | --- |
| Dye-1 | 1.75 | 1.75 | 1.75 | 1.75 | 1.75 |
| ITX | 5.00 | 5.00 | 5.00 | 5.00 | 5.00 |
| IC907 | 5.00 | 5.00 | 5.00 | 5.00 | 5.00 |

TABLE 17-continued

| wt % of component: | C-1 | C-2 | I-1 | I-2 | I-3 |
|---|---|---|---|---|---|
| IC819 | 3.00 | 3.00 | 3.00 | 3.00 | 3.00 |
| TPO | 2.00 | 2.00 | 2.00 | 2.00 | 2.00 |
| INHIB | 1.00 | 1.00 | 1.00 | 1.00 | 1.00 |
| PEG200DA | 52.25 | — | — | — | — |
| HDDA | 30.00 | — | — | — | — |
| VEEA | — | — | — | — | 20.00 |
| PETA | — | — | — | 26.00 | — |
| ACMO | — | — | 52.25 | 26.25 | — |
| HYDRO-8 | — | 52.25 | — | — | 32.25 |
| HYDRO-11 | — | 30.00 | 30.00 | 30.00 | 30.00 |

Evaluation and Results

Isola™ 400 copper plates from CCI Eurolam were cleaned for 5 seconds at 25° C. with a solution called Mecbrite™ CA-95 from MEC Europe, which has pH<1 and contained $H_2SO_4$, $H_2O_2$ and $Cu^{2+}$. During this operation a thin top layer of Cu (0.3-0.5 μm) was removed. The plates were then rinsed with a water jet for 90 seconds.

A pattern of the UV curable inkjet inks C-1, C-2 and I-1 to I-3 was applied at a thickness of 10 μm on the copper plate and cured by a Fusion DRSE-120 conveyer, equipped with a Fusion VPS/I600 lamp (D-bulb), which transported the samples for full curing twice under the UV-lamp on a conveyer belt at a speed of 20 m/min. The maximum output of the lamp was 1.05 $J/cm^2$ and a peak intensity of 5.6 $W/cm^2$.

The plates were subjected to an acidic etch bath ("Mega" acid etchant obtained from Mega Electronics, pH 2, contains $FeCl_3$) for 75 seconds at 35° C. The plates were subsequently rinsed for 90 seconds with water and dried. An evaluation of the etch resistance was then made as shown in Table 18.

The etched copper plates were subjected for 5 minutes at 50° C. to an alkaline strip bath (containing 5% NaOH), then rinsed for 90 seconds with water, dried, and evaluated for strippability and the shape of the stripped ink layer. The results are shown in Table 18.

TABLE 18

| UV Curable Inkjet Ink | Etch Resistance (ER %) | Stripping (after 5 min) Strippability (SB %) | Visual Shape |
|---|---|---|---|
| COMP-1 | 100% | 100% | large flakes |
| COMP-2 | 100% | 100% | small flakes |
| INV-1 | 100% | 100% | fully dissolved |
| INV-2 | 100% | 100% | fully dissolved |
| INV-3 | 100% | 100% | fully dissolved |

From Table 18, it should be clear that the UV curable inkjet inks I-1 to I-3 provided results for etch resistance and strippability that are comparable to those of the comparative UV curable inkjet inks C-1 and C-2, with the exception that the cured ink pattern in the alkaline stripping bath fully dissolved into a blue colored liquid within 5 minutes.

It was found that by replacing the colorant Dye-1 by crystal violet that the colored cured ink pattern in the alkaline stripping bath fully dissolved into a colourless liquid within 5 minutes. By using crystal violet as a dye that decolorizes at a pH of more than 10, two advantageous effects were obtained. Firstly, the cured ink pattern could be visually inspected before etching. Secondly, when the stripping solution starts to get colored after multiple strippings, this forms an indication to replace the stripping solution.

Example 3

This example illustrates how the flake formation can be influenced by changing the composition of a UV curable inkjet ink.

Preparation of the UV Curable Inkjet Inks

The UV curable inkjet inks NS-1 to NS-6 and SB-1 to SB-16 were prepared according to a composition of Type A or B in Table 19. The weight percentages (wt %) were all based on the total weight of the UV curable inkjet ink.

TABLE 19

| | wt % in the inkjet ink | |
|---|---|---|
| Components | Type A | Type B |
| Dye-1 | 1.00 | 1.75 |
| Polymerizable composition according to Table 20 | 86.00 | 82.25 |
| ITX | 4.00 | 5.00 |
| EPD | 4.00 | — |
| TPO | 4.00 | 2.00 |
| IC819 | — | 3.00 |
| IC907 | — | 5.00 |
| INHIB | 1.00 | 1.00 |

The amount and type of monomers used in the polymerizable composition of the inkjet inks are shown in Table 20. The weight percentages (wt %) in Table 20 were all based on the total weight of the polymerizable composition. The viscosity of the inks was measured at 45° C. and is shown in Table 21.

TABLE 20

Polymerizable Composition for Table 19

| Inkjet Ink Sample | Type | Acryl Amide | wt % | Poly-functional acrylate | wt % | Acid acrylate | wt % |
|---|---|---|---|---|---|---|---|
| NS-1 | A | MADAME | 47.7 | SR606A | 46.5 | CEA | 5.8 |
| NS-2 | A | MADAME | 47.7 | DPGDA | 46.5 | CEA | 5.8 |
| NS-3 | A | ACMO | 53.5 | SR606A | 46.5 | CEA | 0.0 |
| NS-4 | B | VEEA | 48.9 | SR606A | 45.0 | CEA | 6.1 |
| NS-5 | B | IDA | 48.9 | SR606A | 45.0 | CEA | 6.1 |
| NS-6 | B | ACMO | 8.8 | SR606A | 85.1 | CEA | 6.1 |
| SB-1 | A | ACMO | 47.7 | SR606A | 46.5 | CEA | 5.8 |
| SB-2 | A | ACMO | 53.5 | SR606A | 40.7 | CEA | 5.8 |
| SB-3 | A | ACMO | 59.3 | SR606A | 34.9 | CEA | 5.8 |
| SB-4 | A | ACMO | 65.1 | SR606A | 29.1 | CEA | 5.8 |
| SB-5 | A | ACMO | 50.6 | SR606A | 46.5 | CEA | 2.9 |
| SB-6 | A | ACMO | 52.3 | SR606A | 46.5 | CEA | 1.2 |
| SB-7 | A | ACMO | 47.7 | DPGDA | 46.5 | CEA | 5.8 |
| SB-8 | A | ACMO | 47.7 | HDDA | 46.5 | CEA | 5.8 |
| SB-9 | A | ACMO | 47.7 | NPGDA | 46.5 | CEA | 5.8 |
| SB-10 | A | ACMO | 47.7 | TMPTA | 46.5 | CEA | 5.8 |
| SB-11 | A | ACMO | 47.7 | PETA | 46.5 | CEA | 5.8 |
| SB-12 | B | ACMO | 33.1 | SR606A | 60.8 | CEA | 6.1 |
| SB-13 | B | ACMO | 21.0 | SR606A | 72.9 | CEA | 6.1 |
| SB-14 | A | ACMO | 41.9 | SR606A | 46.5 | CEA | 11.6 |
| SB-15 | A | ACMO | 47.7 | SR606A | 46.5 | SR9054 | 5.8 |
| SB-16 | A | ACMO | 41.9 | SR606A | 46.5 | SR9054 | 11.6 |

Evaluation and Results

Isola™ IS400 copper plates from CCI Eurolam were cleaned for 5 seconds at 25° C. with a solution called Mecbrite™ CA-95 from MEC Europe, which has pH<1 and contained $H_2SO_4$, $H_2O_2$ and $Cu^{2+}$. During this operation a thin top layer of Cu (0.3-0.5 μm) was removed. The plates were then rinsed with a water jet for 90 seconds.

A pattern of the UV curable inkjet inks NS-1 to NS-6 and SB-1 to SB-16 was printed unidirectional by means of an Anapurna™ M inkjet printer equipped with Konica Minolta 512 print heads at 14 pL drop volume in 8 passes (1440×720 dpi) and cured by means of an Fe doped Hg lamp with an output of 550 mJ/cm². An evaluation for cure speed was made and the result is shown in Table 21.

The plates were subjected to an acidic etch bath ("Mega" acid etchant obtained from Mega Electronics, pH 2, contains $FeCl_3$) for 115 seconds at 35° C. The plates were subsequently rinsed for 90 seconds with water and dried. An evaluation of the etch resistance was then made as shown in Table 21.

The strippability (SB) was determined using the etched and dried samples by submitting into a beaker containing 6.25% NaOH-solution at 50° C. and stirred. The time of release of the inkjetted layer from the metal surface, i.e. the release time, was measured.

TABLE 21

| Inkjet Ink | Viscosity (mPa · s) | Cure Speed | Etch Resistance (ER) | Strippability (SB) | Flakes |
| --- | --- | --- | --- | --- | --- |
| NS-1 | 4 | Not OK | OK | OK | OK |
| NS-2 | 3 | Not OK | OK | OK | OK |
| NS-3 | 8 | OK | OK | Not OK | OK |
| NS-4 | 7 | OK | OK | Not OK | OK |
| NS-5 | 7 | OK | OK | Not OK | OK |
| NS-6 | 15 | OK | OK | Not OK | Moderate |
| SB-1 | 9 | OK | OK | OK | OK |
| SB-2 | 9 | OK | OK | OK | OK |
| SB-3 | 9 | OK | OK | OK | OK |
| SB-4 | 8 | OK | OK | OK | OK |
| SB-5 | 9 | OK | OK | OK | OK |
| SB-6 | 9 | OK | OK | Moderate | OK |
| SB-7 | 7 | OK | OK | OK | OK |
| SB-8 | 6 | OK | OK | OK | OK |
| SB-9 | 6 | OK | OK | OK | OK |
| SB-10 | 13 | OK | OK | OK | OK |
| SB-11 | 20 | OK | OK | OK | OK |
| SB-12 | 14 | OK | OK | OK | OK |
| SB-13 | 14 | OK | OK | OK | OK |
| SB-14 | 11 | OK | OK | OK | OK |
| SB-15 | 10 | OK | OK | OK | OK |
| SB-16 | 11 | OK | OK | OK | OK |

From Table 21, it should be clear that only the UV curable inkjet inks SB-1 to SB-16 complying with the specific composition mentioned above for "Strippable UV curable Inkjet Inks" exhibited excellent results. By replacing the acrylamide ACMO by other monomers that are equally hydrophilic but are (meth)acrylates, or by ignoring the ranges for the acryl amide, the polyfunctional acrylate and the acid monomer, the UV curable inkjet inks failed on one or more of the requirements for manufacturing embossing plates.

Example 4

This example illustrates the manufacturing of a decorative laminate using an embossing plate having two different heights in its relief
Preparation of the UV Curable Inkjet Ink LED-1

The UV curable inkjet ink Ink-2 of Example 1 was taken as the UV curable inkjet ink LED-1 used in this experiment.
Preparation of Decorative Surface Before inkjet printing, a 1 mm thick stainless steel 316L plate was cleaned for 10 seconds at 25° C. with acetone. An image of the UV curable inkjet ink LED-1 was inkjet printed using a MJK 2013K1 inkjet printing system from MicroCraft equipped with a KM1024S print head. The image was printed in 8 passes in a resolution of 720×1440 dpi with UV curing after each of the passes using a 395 nm SubZero LED 090 from Integration Technology. The inkjet printed plate was then given a heat treatment for 15 minutes at 150° C.

The plate was subjected a first time to an acidic etch bath (40% $FeCl_3$) for 10 minutes at 50° C. The plate was dried at room temperature.

A second image with the UV curable inkjet ink LED-1 was printed on the unprotected metallic surface using a MJK 2013K1 inkjet printing system from MicroCraft. The same curing method as in the first step was used.

The plate was subjected for a second time to an acidic etch bath (40% $FeCl_3$) for 10 minutes at 50° C. The plate was dried at room temperature.

The etched plate was subjected at 50° C. to an alkaline strip bath (containing 3% NaOH) for 2 minutes in a horizontal stripping unit of PILL at 50° C. to deliver an embossing plate. The relief of the first inkjet printed image had a height of 153 μm, while the relief of the second inkjet printed image had a height of 59 μm.

A wood image was printed on a 100 μm thick opaque white polyvinyl chloride foil. Then a layer assembly was made according to Table 22, with in order the embossing plate, a 500 μm thick transparent polyvinyl chloride foil, and the printed 100 μm PVC foil. The relief of the embossing plate and the wood image on the 100 μm PVC foil are both facing the 500 μm PVC foil.

TABLE 22

| |
| --- |
| Embossing plate |
| 500 μm transparent PVC |
| Wood image |
| 100 μm opaque PVC |

The layer assembly was then heat pressed using a Excelam™ 655 Q laminator from GMP CO Ltd. at a speed set to 1 (3.9 mm/s), a temperature of 160° C. and a pressure setting of 38 μm distance between the two rolls. The result was an embossed decorative laminate having different depths of indentations.

Example 5

This example illustrates the UV LED curability of a UV curable inkjet ink, wherein after etching the UV cured image is solubilized. This avoids the necessity to filter out flakes of the cured ink image.
Preparation of the UV Curable Inkjet Inks The UV curable inkjet inks LED-2 to LED-7 were prepared according to Table 23. The weight percentages (wt %) were all based on the total weight of the UV curable inkjet ink.

TABLE 23

| wt % of component: | LED-2 | LED-3 | LED-4 | LED-5 | LED-6 | LED-7 |
| --- | --- | --- | --- | --- | --- | --- |
| ACMO | 22.25 | 26.00 | 31.00 | 36.00 | 21.00 | 21.00 |
| HYDRO-8 | 41.00 | 36.00 | 31.00 | 26.00 | 39.00 | 39.00 |
| HYDRO-11 | 23.25 | 23.25 | 23.25 | 23.25 | 23.25 | 23.25 |
| CEA | — | — | — | — | 2.00 | — |
| SUC | — | — | — | — | — | 2.00 |
| INHIB | 1.00 | 1.00 | 1.00 | 1.00 | 1.00 | 1.00 |

TABLE 23-continued

| wt % of component: | LED-2 | LED-3 | LED-4 | LED-5 | LED-6 | LED-7 |
|---|---|---|---|---|---|---|
| ITX | 4.00 | 4.00 | 4.00 | 4.00 | 4.00 | 4.00 |
| TPO | 4.00 | 4.00 | 4.00 | 4.00 | 4.00 | 4.00 |
| EPD | 4.00 | 4.00 | 4.00 | 4.00 | 4.00 | 4.00 |
| Crystal Violet | 0.50 | 1.75 | 1.75 | 1.75 | 1.75 | 1.75 |
| Viscosity (mPa·s) | 16 | 17 | 14 | 14 | 18 | 18 |

Evaluation and Results

Isola™ 400 copper plates from CCI Eurolam were cleaned for 5 seconds at 25° C. with a solution called Mecbrite™ CA-95 from MEC Europe, which has pH<1 and contained $H_2SO_4$, $H_2O_2$ and $Cu^{2+}$. During this operation a thin top layer of Cu (0.3-0.5 μm) was removed. The plates were then rinsed with a water jet for 90 seconds.

An image of the UV curable inkjet inks LED-2 to LED-7 was inkjet printed using a MJK 2013K1 inkjet printing system from MicroCraft. The inkjet printed sample was mounted on a belt, transporting the sample once under a Phoseon 8 W 395 nm LED at a speed of 10 m/min.

The plates were subjected to an acidic etch bath ("Mega" acid etchant obtained from Mega Electronics, pH 2, contains $FeCl_3$) for 75 seconds at 35° C. The plates were subsequently rinsed for 90 seconds with water and dried. The adhesion (ADH) was determined and the results are shown in Table 24.

The etched copper plates were subjected at 50° C. to an alkaline strip bath (containing 6.25% NaOH) under constant stirring and each minute evaluated for the shape of the stripped ink layer. The results are shown in Table 25.

TABLE 24

| Inkjet Ink | Adhesion | Fully solubilized after: |
|---|---|---|
| LED-2 | 0 | 5 minutes stirring |
| LED-3 | 0 | 5 minutes stirring |
| LED-4 | 0 | 2 minutes stirring |
| LED-5 | 0 | 2 minutes stirring |
| LED-6 | 1 | 2 minutes stirring |
| LED-7 | 1 | 5 minutes stirring |

Table 24 shows that the UV LED cured images exhibited good adhesion after etching and were all solubilized after 5 minutes of stirring in the alkaline strip bath.

REFERENCE SIGNS LIST

FIGS. 1 to 5 use the following reference signs.

TABLE 25

| 1 | Metal plate |
|---|---|
| 2 | Decorative pattern |
| 3 | Metal covered by decorative pattern |
| 4 | Metallic relief |
| 5 | Embossing plate |
| 6 | Second decorative pattern |
| 7 | Second metallic relief |
| 8 | Heat press |
| 9 | Protective layer |
| 10 | Decorative layer |
| 11 | Base layer |
| 12 | Back layer |
| 13 | Cavity |
| 14 | Decorative panel |
| 15 | Tongue |
| 16 | Groove |
| 17 | PVC roll manufacturer |
| 18 | PVC roll |
| 19 | Floor panel manufacturer |
| 20 | Warehouse PVC rolls |
| 21 | Inkjet printing |
| 22 | Decorative PVC roll |
| 23 | Base layer |
| 24 | Roll of base layer |
| 25 | Embossing belt |
| 26 | Unwind system |
| 27 | Rewind system |
| 28 | Heat pressing |
| 29 | Decorative panel |
| 30 | Decorative panel set |
| 31 | Frame |
| 32 | Etchant inlet |
| 33-35 | Etchant flow directions |
| 36 | Etchant outlet |

The invention claimed is:

1. A method of manufacturing an embossing element for decorative surfaces, the method comprising the steps of:
    inkjet printing a UV curable inkjet ink to form a decorative pattern on a metallic surface; and
    forming a relief by etching metal from the metallic surface; wherein
    the UV curable inkjet ink includes:
        one or more photoinitiators;
        optionally, a colorant that decolorizes at a pH of more than 10;
        (a) one or more hydrolyzable polyfunctional monomers including at least one alkali hydrolyzable group located in an atomic chain between two polymerizable groups of the hydrolyzable polyfunctional monomer, or (b) one or more hydrolyzable polyfunctional oligomers including at least one alkali hydrolyzable group located in an atomic chain between two polymerizable groups of the hydrolyzable polyfunctional oligomer; and
        one or more water absorption controlling monomers that are a monofunctional or difunctional monomer including at least one functional group selected from the group consisting of a hydroxyl group, an ethylene oxide or oligo-ethylene oxide group, a tertiary amine group, an acidic group having a $pK_a$ not lower than 3, and a five to seven membered aromatic or non aromatic heterocyclic group; and
    the at least one alkali hydrolyzable group located in the atomic chain between two polymerizable groups of the polyfunctional monomer or oligomer is selected from the group consisting of Formulas H-1 to H-4:

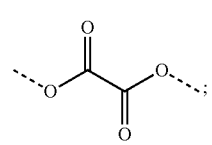

H-1

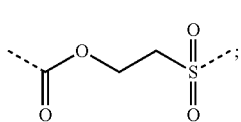

H-2

-continued

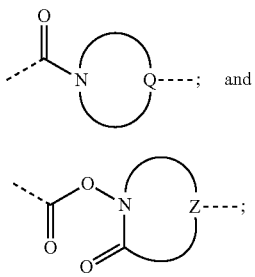

H-3 and

H-4 wherein
Q represents the necessary atoms to form a five membered aromatic ring group;
Z represents the necessary atoms to form a five or six membered ring group; and
the dashed lines represents the bonds to the rest of the polyfunctional monomer or oligomer.

2. The method according to claim 1, further comprising the step of:
stripping the decorative pattern from the metallic surface with an alkaline solution.

3. The method according to claim 2, wherein the decorative pattern is dissolved in the alkaline solution.

4. The method according to claim 1, wherein the embossing element has a plate shape or a substantially plate shape.

5. The method according to claim 1, wherein the embossing element has a belt shape or a substantially belt shape.

6. The method according to claim 1, further comprising the step of:
curing the UV curable inkjet ink with LEDs.

7. A method for manufacturing an embossed decorative surface including the steps of:
manufacturing the embossing element according to claim 1;
inkjet printing on a substrate a second decorative pattern corresponding to the relief of the embossing element; and
heat pressing the embossing element onto a laminate assembly including the substrate with the second decorative pattern in register with the relief of the embossing element.

8. The method according to claim 7, wherein the laminate assembly includes one or more resin impregnated papers.

9. The method according to claim 8, wherein the one or more resin impregnated papers include a thermosetting resin selected from the group consisting of melamine-formaldehyde based resins, ureum-formaldehyde based resins, and phenol-formaldehyde based resins.

10. The method according to claim 7, wherein the laminate assembly includes one or more thermoplastic foils.

11. The method according to claim 10, wherein the one or more thermoplastic foils includes a polyvinylchloride foil.

12. The method according to claim 7, wherein the decorative surface is a decorative panel including a tongue and groove joint.

13. The method according to claim 1, wherein the at least one alkali hydrolyzable group is an oxalate ester group.

* * * * *